(12) United States Patent
Kitazoe

(10) Patent No.: US 8,180,058 B2
(45) Date of Patent: May 15, 2012

(54) ENCRYPTION OF THE SCHEDULED UPLINK MESSAGE IN RANDOM ACCESS PROCEDURE

(75) Inventor: Masato Kitazoe, Hachiouji (JP)

(73) Assignee: QUALCOMM Incorporated ( * ) Notice: Subject to any disclaimer, the term of this patent is extended or adjusted under 35 U.S.C. 154(b) by 650 days.

(21) Appl. No.: 12/136,511

(22) Filed: Jun. 10, 2008

(65) Prior Publication Data
US 2009/0041246 A1 Feb. 12, 2009

Related U.S. Application Data

(60) Provisional application No. 60/945,465, filed on Jun. 21, 2007, provisional application No. 60/955,867, filed on Aug. 14, 2007.

(51) Int. Cl.
H04K 1/00 (2006.01)

(52) U.S. Cl. ........................................... 380/270

(58) Field of Classification Search ............... 380/270
See application file for complete search history.

(56) References Cited

U.S. PATENT DOCUMENTS
2008/0310396 A1* 12/2008 Park et al. ................... 370/350

FOREIGN PATENT DOCUMENTS
WO WO2008156276 A2 12/2008

OTHER PUBLICATIONS

"Nokia Siemens Networks: ""Update on Mobility, Security, Random Access Procedure, etcA""3GPP Draft; R2-072338 Stage 2 Update RAN2,3rd Generation Partnership Project (3GPP), Mobile Competence Centre ; 650, Route Des Lucioles ; F-06921 Sophia-Antipolis Cedex; France,vol. tsg_ran\WG2_RL2\TSGR2_58\Docunients,no. Kobe, Japan; 20070507,May 23, 2007, XP050135175".
International Search Report—PCT/US2008/067934, International Search Authority—European Patent Office—Dec. 19, 2008.
Written Opinion—PCT/US2008/067934, International Search Authority—European Patent Office—Dec. 19, 2008.
Nokia, Nokia Siemens Networks, "Update on Mobility, Security, Random Access Procedures, etc.," 3GPP TSG-RAN Meeting #36, Busan, Korea, RP-070494, May 29-Jun. 1, 2007.

* cited by examiner

Primary Examiner — Jacob Lipman
(74) Attorney, Agent, or Firm — D. Scott Juneau; Michael DeHaemer

(57) ABSTRACT

Systems and methodologies are described that facilitate employing a random access procedure that leverages encrypted and/or unencrypted data in a scheduled uplink message. A random access preamble can be sent from an access terminal to a base station, and a random access response can be sent from the base station to the access terminal. A scheduled transmission message can be sent from the access terminal to the base station based upon a grant included in the random access response. When contention based random access is employed, the scheduled transmission message or a portion thereof can be unencrypted. Further, non-security-critical information can be sent in an unencrypted manner in the scheduled transmission message, while security-critical information can be encrypted for transmission (e.g., included in an encrypted portion of the scheduled transmission message and/or transmitted in a subsequent encrypted normal scheduled transmission message).

42 Claims, 14 Drawing Sheets

ENCRYPTION OF THE SCHEDULED UPLINK MESSAGE IN RANDOM ACCESS PROCEDURE

CROSS-REFERENCE TO RELATED APPLICATIONS

This application claims the benefit of U.S. Provisional Patent application Ser. No. 60/945,465 entitled "METHOD AND APPARATUS FOR ENCRYPTING UPLINK SCHEDULED MESSAGE IN RANDOM ACCESS PROCEDURE" which was filed Jun. 21, 2007 and U.S. Provisional Patent application Ser. No. 60/955,867 entitled "A METHOD AND APPARATUS FOR ENCRYPTING UPLINK SCHEDULED MESSAGE IN RANDOM ACCESS PROCEDURE" which was filed Aug. 14, 2007. The entirety of the aforementioned application is herein incorporated by reference.

BACKGROUND

I. Field

The following description relates generally to wireless communications, and more particularly to controlling encryption of uplink messages in a random access procedure in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into Ns independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

An access terminal can utilize a random access procedure to gain access to a system (e.g. to obtain allocation of a communications channel and/or associated resources, ... ). For instance, the random access procedure can be used for initial access to the system, handover from a source base station to a target base station, uplink timing synchronization for data transfer, and the like. Typically, an access terminal sends a random access preamble on the uplink when the access terminal desires to gain access to the system. A base station can receive the random access preamble and respond with a random access response sent over the downlink. Based upon the random access response, the access terminal can attempt to send a scheduled transmission over the uplink to the base station. However, in the case of contention based random access, the base station can be unaware of an identity of the access terminal attempting to transmit the scheduled transmission. Hence, conventional techniques oftentimes fail to account for the base station being unable to determine an identity of a source from which the scheduled transmission originates, which can be particularly problematic when such scheduled transmission is encrypted.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of a random access procedure that leverages encrypted and/or unencrypted data in a scheduled uplink message. A random access preamble can be sent from an access terminal to a base station, and a random access response can be sent from the base station to the access terminal. A scheduled transmission message can be sent from the access terminal to the base station based upon a grant included in the random access response. When contention based random access is employed, the scheduled transmission message or a portion thereof can be unencrypted. Further, non-security-critical information can be sent in an unencrypted manner in the scheduled transmission message, while security-critical information can be encrypted for transmission (e.g., included in an encrypted portion of the scheduled transmission message and/or transmitted in a subsequent encrypted normal scheduled transmission message).

According to related aspects, a method that facilitates employing a random access procedure in a wireless communication environment is described herein. The method can include transmitting a random access preamble to a base station. Further, the method can comprise receiving a random access response from the base station based upon the random access preamble. Moreover, the method can include transmitting a scheduled transmission message, which includes at least a portion that is unencrypted, to the base station as granted by the random access response when employing contention based random access.

Another aspect relates to a wireless communications apparatus. The wireless communications apparatus can include a memory that retains instructions related to transmitting a random access preamble to a base station for at least one of initial access, re-entry from non-synchronized state, or handover from a source base station to the base station, receiving a random access response from the base station based upon the random access preamble, transmitting a scheduled transmission message, which includes at least a portion that is unencrypted, to the base station as granted by the random access response when employing contention based random access, and receiving a contention resolution message from the base station in response to the scheduled transmission message. Further, the wireless communications apparatus can include a processor, coupled to the memory, configured to execute the instructions retained in the memory.

Yet another aspect relates to a wireless communications apparatus that enables utilizing a random access procedure in a wireless communication environment. The wireless communications apparatus can include means for sending a random access preamble that includes a common random access signature to a base station when employing contention based random access. Moreover, the wireless communications apparatus can include means for obtaining a random access response from the base station based upon the random access preamble. Further, the wireless communications apparatus can include means for sending a scheduled transmission including at least an unencrypted portion to the base station as granted by the random access response when employing contention based random access.

Still another aspect relates to a computer program product that can comprise a computer-readable medium. The computer-readable medium can include code for transmitting a random access preamble to a base station. Further, the computer-readable medium can include code for receiving a random access response from the base station based upon the random access preamble. Moreover, the computer-readable medium can comprise code for transmitting a scheduled transmission including at least an unencrypted portion to the base station as granted by the random access response when employing contention based random access.

In accordance with another aspect, an apparatus in a wireless communication system can include a processor, wherein the processor can be configured to transmit a random access preamble to a base station. The processor can also be configured to receive a random access response from the base station based upon the random access preamble. Further, the processor can be configured to transmit a scheduled transmission including at least an unencrypted portion to the base station as granted by the random access response when employing contention based random access.

According to other aspects, a method that facilitates deciphering data obtained during a random access procedure in a wireless communication environment is described herein. The method can include receiving a random access preamble from an access terminal. Further, the method can include transmitting a random access response to the access terminal based upon the random access preamble. The method can also comprise receiving a scheduled transmission message, which includes at least a portion that is unencrypted, from the access terminal when employing contention based random access. Moreover, the method can include recognizing an identity of the access terminal based upon information included in the portion of the scheduled transmission message that is unencrypted when employing contention based random access.

Yet another aspect relates to a wireless communications apparatus that can include a memory that retains instructions related to receiving a random access preamble from an access terminal, transmitting a random access response to the access terminal based upon the random access preamble, receiving a scheduled transmission message, which includes at least a portion that is unencrypted, from the access terminal when employing contention based random access, recognizing an identity of the access terminal based upon information included in the portion of the scheduled transmission message that is unencrypted when employing contention based random access, and determining a security context associated with the access terminal based upon the recognized identity of the access terminal. Further, the wireless communications apparatus can comprise a processor, coupled to the memory, configured to execute the instructions retained in the memory.

Another aspect relates to a wireless communications apparatus that enables employing a random access procedure in a wireless communication environment. The wireless communications apparatus can include means for obtaining a scheduled transmission message including at least an unencrypted portion from the access terminal when employing contention based random access. The wireless communications apparatus can further include means for recognizing an identity of the access terminal based upon information included in the unencrypted portion of the scheduled transmission message. The wireless communications apparatus can also include means for retrieving a security context associated with the access terminal based upon the recognized identity of the access terminal. Moreover, the wireless communications apparatus can include means for deciphering an encrypted, normal scheduled transmission message or encrypted portion of the scheduled transmission message that includes the unencrypted portion received from the access terminal based upon the retrieved security context.

Still another aspect relates to a computer program product that can comprise a computer-readable medium. The computer-readable medium can include code for obtaining a scheduled transmission message including at least an unencrypted portion from the access terminal when employing contention based random access. The computer-readable medium can also include code for recognizing an identity of the access terminal based upon information included in the unencrypted portion of the scheduled transmission message. The computer-readable medium can further include code for retrieving a security context associated with the access terminal based upon the recognized identity of the access terminal. Moreover, the computer-readable medium can include code for deciphering an encrypted, normal scheduled transmission message or encrypted portion of the scheduled transmission message that includes the unencrypted portion received from the access terminal based upon the retrieved security context.

In accordance with another aspect, an apparatus in a wireless communication system can include a processor, wherein the processor can be configured to receive a scheduled transmission message including at least an unencrypted portion from the access terminal when employing contention based random access; recognize an identity of the access terminal based upon information included in the unencrypted portion of the scheduled transmission message; retrieve a security context associated with the access terminal based upon the recognized identity of the access terminal; and decipher an encrypted, normal scheduled transmission message or encrypted portion of the scheduled transmission message that includes the unencrypted portion received from the access terminal based upon the retrieved security context.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
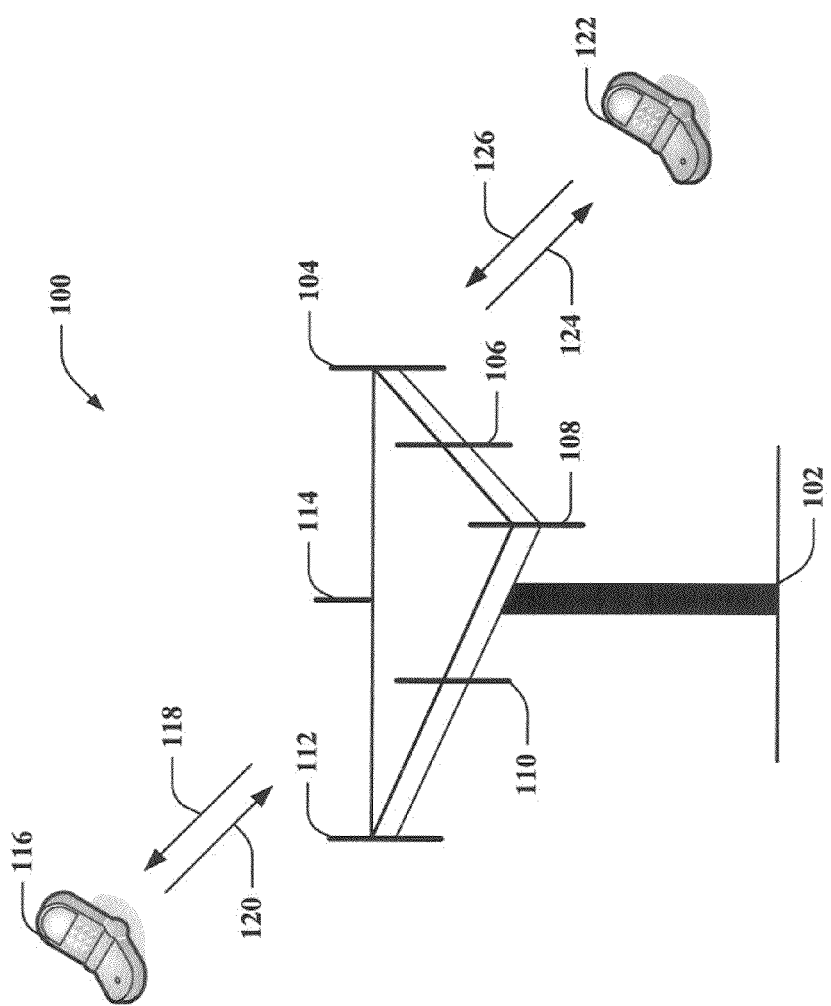
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

A random access procedure can be utilized in system 100. For instance, the random access procedure can be used by access terminals 116 and 122 for initial access, handover to and/or from base station 102, timing synchronization (e.g. re-entry from non-synchronized mode, . . . ), and the like. A random access procedure typically includes transmission of a random access preamble (e.g., message 1, . . . ) by an access terminal (e.g., access terminal 116, access terminal 122, . . . ) to base station 102 over the uplink, transmission of a random access response (e.g., message 2, . . . ) from base station 102 to the access terminal over the downlink based upon the received random access preamble, and transmission of a scheduled transmission (e.g., message 3, . . . ) from the access terminal to base station 102 over the uplink where such scheduled transmission is granted by the random access response message. As used herein, the term "message 3" refers to the scheduled transmission sent by the access terminal to base station 102 as granted by the random access response message from base station 102.

Moreover, there are two types of random access procedures that can be leveraged in system 100: contention based random access and non-contention based random access. According to an illustration, in contention based random access, two or more access terminals 116, 122 can transmit random access preambles to base station 102 at a substantially similar time over a shared resource (e.g., channel) while contending for system access. However, base station 102 typically is unable to identify access terminals 116, 122 that transmit these random access preambles (e.g., a common random access signature can be sent as at least part of the random access preambles from more than one access terminal 116, 122). Base station 102 can send a random access response over the downlink based upon a received random access preamble, and obtain a scheduled transmission from an access terminal in response to the grant included in the random access response; yet, base station 102 may again be unable to identify the access terminal transmitting the scheduled transmission (e.g., message 3, . . . ) unless an access terminal specific identifier is provided in such scheduled transmission. Moreover, in non-contention based random access, an access terminal specific random access signature can be provided to, determined by, etc. an access terminal prior to sending the random access preamble, and this access terminal specific random access signature can be transmitted by the access terminal (e.g., as at least part of the random access preamble, message 1 in a random access procedure, . . . ) to base station 102. Thus, upon receiving the access terminal specific random access signature in non-contention based random access, base station 102 can identify the access terminal from which the random access signature was sent. Further, this identification related information can be used by base station 102 to identify a source of a received scheduled transmission (e.g., message 3, . . . ) that is responsive to a random access response sent by base station 102.

According to an illustration, when contention based random access is employed, the scheduled transmission (e.g., message 3, . . . ) can be unencrypted. Pursuant to another example, when contention based random access is utilized, at least a portion of the scheduled transmission message (e.g., message 3, . . . ) can be unencrypted. Sending an unencrypted message 3 or a portion of such message 3 unencrypted can stem from the network (e.g., base station 102, . . . ) being unable to determine which access terminal transmitted the message 3 upon receipt. Rather, contents of message 3 can be evaluated to recognize the associated source of such message. This evaluation is performed upon unencrypted data (e.g., unencrypted message 3 or unencrypted portion thereof) since base station 102 is unable to decipher an encrypted message without knowing the identity of the access terminal transmitting the encrypted message. In non-contention based random access, this limitation does not exist. Accordingly, when contention based random access is employed, an access terminal can send non-security-critical information (e.g., access terminal identifier, message discriminator, . . . ) in the unencrypted scheduled transmission message (e.g., message 3, . . . ) and/or unencrypted portion of a scheduled transmission message (e.g., message 3, . . . ). Further, the access terminal can transmit security-critical information in a disparate, encrypted message and/or an encrypted portion of the scheduled transmission message (e.g., message 3, . . . ).

Figure 2:
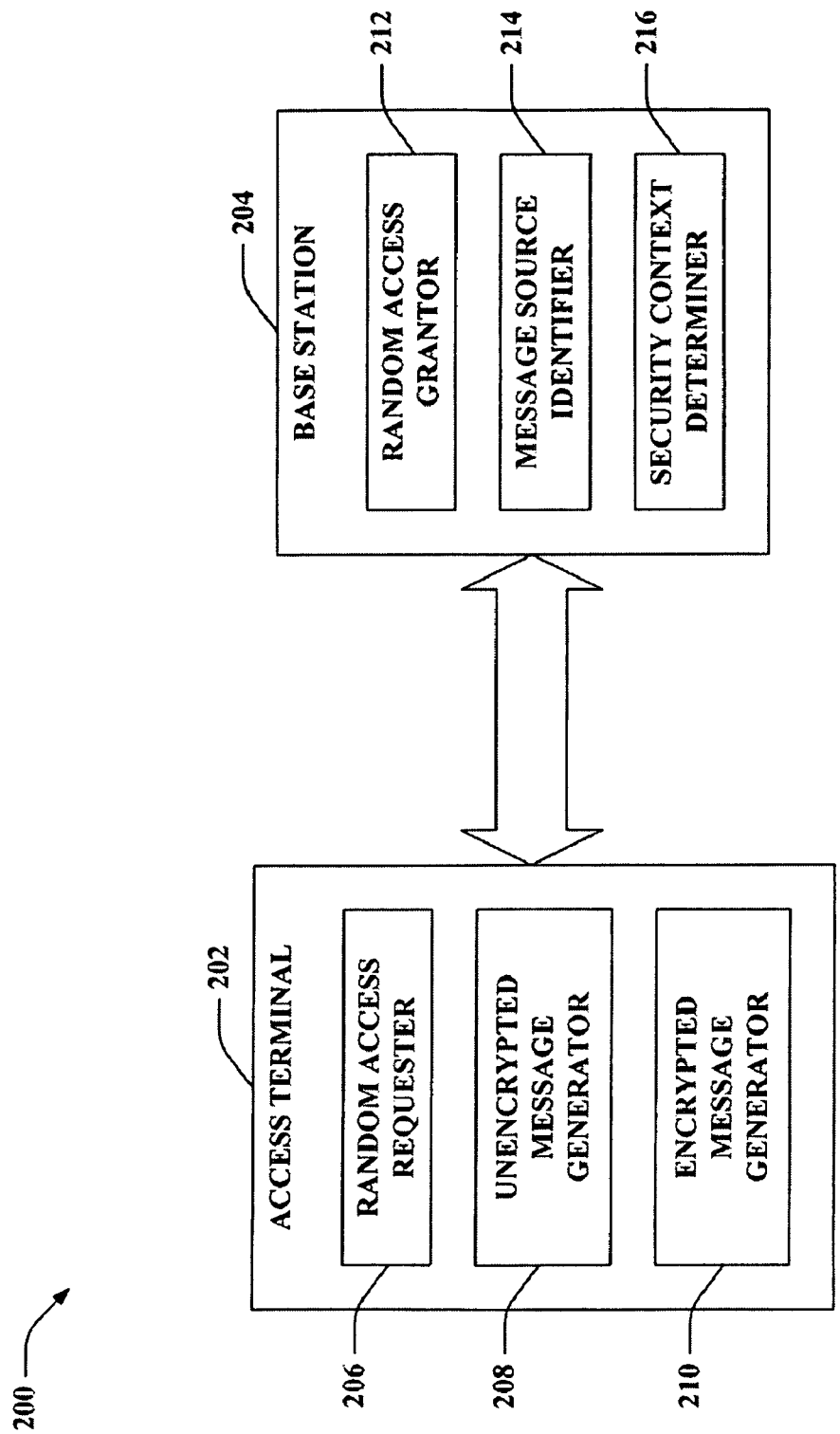
FIG. 2 is an illustration of an example system that controls encryption of uplink messages in a random access procedure.

Now turning to FIG. 2, illustrated is a system 200 that controls encryption of uplink messages in a random access procedure. System 200 includes an access terminal 202 and a base station 204; however, it is to be appreciated that system 200 can include any number of access terminals similar to access terminal 202 and/or any number of base stations similar to base station 204. Access terminal 202 and base station 204 can each transmit and/or receive information, signals, data, instructions, commands, bits, symbols, and the like.

Access terminal 202 can further include a random access requester 206, an unencrypted message generator 208 and an encrypted message generator 210. Moreover, base station 204 can include a random access grantor 212, a message source identifier 214, and a security context determiner 216. Random access requester 206 transmits a random access preamble to base station 204. In case of contention based random access, random access requester 206 can send a generic random access signature as at least part of the random access preamble. Further, in case of non-contention based random access, random access requester 206 can transmit a particular random access signature from a set of random access signatures as at least part of the random access preamble. For instance, the particular random access signature can be assigned to access terminal 202, while at least one disparate random access signature from the set can be allocated to at least one disparate access terminal (not shown). According to another illustration, it is contemplated that random access requester 206 can determine the particular random access signature to employ from the set when operating in a non-contention based random access mode. The particular random access signature can be a dedicated signature that includes a bit pattern unique to access terminal 202 (e.g., other access terminals (not shown) will not use this dedicated signature, . . . ).

By way of another illustration, random access requester 206 (and/or access terminal 202 generally) can determine whether contention based random access or non-contention random access is being utilized in system 200. For instance, random access requester 206 can identify the type of random access procedure being used based upon whether the random access procedure is being employed for initial access, re-entry from non-synchronized mode, handover, and so forth (e.g., the type of random access procedure can be predetermined based upon the use of such procedure, . . . ). However, the claimed subject matter is not limited to the foregoing.

Random access requester 206 can transmit a random access preamble on the uplink whenever access terminal 202 desires to access the system (e.g., if access terminal 202 has data to send, if access terminal 202 is paged by the system, if access terminal 202 receives a handover command to transition from a source base station to a target base station, . . . ). A random access preamble can also be referred to as an access request, an access signature, an access probe, a random access probe, a signature sequence, a Random Access Channel (RACH) signature sequence, etc. The random access preamble can include various types of information and can be sent in various manners.

Further, base station 204 can receive the random access preamble and random access grantor 212 can respond by sending a random access response to access terminal 202. A random access response can also be referred to as an access grant (AGCH), an access response, etc. The random access response can carry various types of information and can be sent in various manners. For instance, the random access response can include control channel resources, uplink resources, control information, and so forth for access terminal 202. By way of illustration, the control channel resources can include Channel Quality Indicator (CQI) resources used to send CQI on the uplink by access terminal 202, power control resources used to send power control corrections on the downlink to access terminal 202, and so forth. Moreover, the control information can include timing information used to adjust transmit timing of access terminal 202, power control corrections used to adjust transmit power of access terminal 202, and the like.

Access terminal 202 can receive the random access response sent by random access grantor 212 of base station 204. The random access response can grant uplink resources to be used by access terminal 202. Moreover, access terminal 202 (e.g., unencrypted message generator 208, encrypted message generator 208, a grant evaluator (not shown) included in access terminal 202, . . . ) can recognize the uplink resources granted to access terminal 202 in the random access response. Thereafter, unencrypted message generator 208 and/or encrypted message generator 210 can yield uplink messages or portions of uplink messages that can be sent from access terminal 202 to base station 204. For instance, granted uplink resources can be utilized to transmit a message 3 yielded by unencrypted message generator 208 and/or encrypted message generator 210.

According to an example, when contention based random access is employed, unencrypted message generator 208 can yield an unencrypted message 3 for transmission to base station 204. The unencrypted message 3 can be transmitted to base station 204 rather than an encrypted message since the network (e.g., base station 204, . . . ) can lack knowledge of the originator of message 3 (e.g., message source identifier 214 can be unable to determine an identity of access terminal 202 from a random access preamble sent over the uplink by random access requester 206 of access terminal 202 when using contention based random access, . . . ). If base station 204 is unaware of the originator of message 3 and message 3 were to be encrypted, base station 204 would not know which security configuration to apply in order to decrypt such encrypted message (e.g., base station 204 would be unable to decipher the encrypted message 3 when using contention based random access, . . . ). Thus, access terminal 202 cannot apply encryption for the uplink message 3 transmitted in the contention based random access even if Radio Resource Control (RRC) security is active. Rather, access terminal 202 can send message 3 unencrypted due to the above limitations under various scenarios including, but not limited to, transmission of handover complete in a target cell, transmission of handover failure in a source cell, uplink timing synchronization for data transfer, and so forth.

Following this example, unencrypted message generator 208 can yield an unencrypted message (e.g., unencrypted message 3, . . . ) that includes information, parameters, etc. that need not be ciphered. For instance, the unencrypted message built by unencrypted message generator 208 can include a temporary identifier such as a Cell Radio Network Temporary Identifier (C-RNTI) corresponding to access terminal 202; however, it is to be appreciated that any differing type of identifier can be used instead of or in addition to the C-RNTI. Moreover, unencrypted message generator 208 can determine disparate information, parameters, etc. (e.g., non-security-critical information, . . . ) that can be transmitted as part of the unencrypted uplink message (e.g., unencrypted message 3, . . . ). Further, security-critical information can be included in encrypted message(s) yielded by encrypted message generator 210 and transmitted after random access in accordance with this example. Additionally, message 3 can be transmitted by access terminal 202 via using Radio Link Control—Transparent Mode (RLC-TM).

By sending an unencrypted message 3 yielded from unencrypted message generator 208 per the aforementioned example, message source identifier 214 can evaluate the unencrypted message 3 to determine that access terminal 202 transmitted such unencrypted message 3. Message source identifier 214 can similarly analyze at least one disparate unencrypted message 3 sent from at least one disparate access terminal (not shown) to identify the corresponding source(s). For instance, the unencrypted message 3 yielded by unencrypted message generator 208 and sent by access terminal 202 can include the temporary identifier (e.g., C-RNTI, . . . ) associated with access terminal 202. Further, message source identifier 214 can analyze this temporary identifier to recognize that such identifier corresponds to access terminal 202.

Upon message source identifier 214 identifying the source of the unencrypted message, security context determiner 216 can recognize a security context associated with the identified source. For example, when message source identifier 214 determines access terminal 202 to be the source of an unencrypted message 3, security context determiner 216 can identify, retrieve, generate, etc. the security context corresponding to access terminal 202. By way of illustration, base station 204 may have previously associated access terminal 202 with a given security context while access terminal 202 was in connected mode at an earlier time, and this given security context can be retained in memory associated with base station 204 for later retrieval when the random access procedure is effectuated. Alternatively, under the handover scenario, the security context associated with access terminal 202 can be obtained from a disparate base station (not shown) when access terminal 202 is sent a handover command from the disparate base station to initiate handover to base station 204. The security context as recognized can thereafter be utilized to decipher encoded message(s) generated by encrypted message generator 210 and sent by access terminal 202.

Moreover, message source identifier 214 and/or base station 204 in general can send a contention resolution message (e.g., message 4, . . . ) to access terminal 202 upon determining an identity of the source of the unencrypted message 3. Thereafter, encrypted message generator 210 can yield a normal scheduled encrypted transmission that can be sent over the uplink. Moreover, it is contemplated that encrypted message generator 210 can utilize substantially any type of encryption technique(s). Further, the security context corresponding to access terminal 202 as recognized by security context determiner 216 can be leveraged by base station 204 to decrypt encrypted messages yielded by encrypted message generator 210 and sent over the uplink.

By way of another illustration, when non-contention based random access is employed, message source identifier 214 can identify access terminal 202 as the source of a random access preamble when transmitted by random access requester 206 of access terminal 202. For instance, message source identifier 214 can recognize a given access terminal specific random access signature included in the random access preamble as being associated with access terminal 202. Thus, access terminal 202 can send an encrypted message 3 yielded by encrypted message generator 210 over the uplink to base station 204 since security context determiner 216 of base station 204 can identify a security context associated with access terminal 202 to be used for decryption based upon the random access preamble (e.g., rather than based upon message 3 as is the case for contention based random access). In an aspect, access terminal 202 can send an encrypted RRC message yielded by encrypted message generator 210 when possible (e.g., in non-contention based random access, message 3 is encrypted if security is active, . . . ). As opposed to the contention based random access, access terminal 202 does not have a specific restriction as to what it can send in message 3 under the non-contention based random access scenario. Thus, access terminal 202 can apply different restrictions (e.g., perform different actions, . . . ) depending on the type of random access procedure being utilized. However, the claimed subject matter is not limited to the aforementioned examples.

Figure 3:
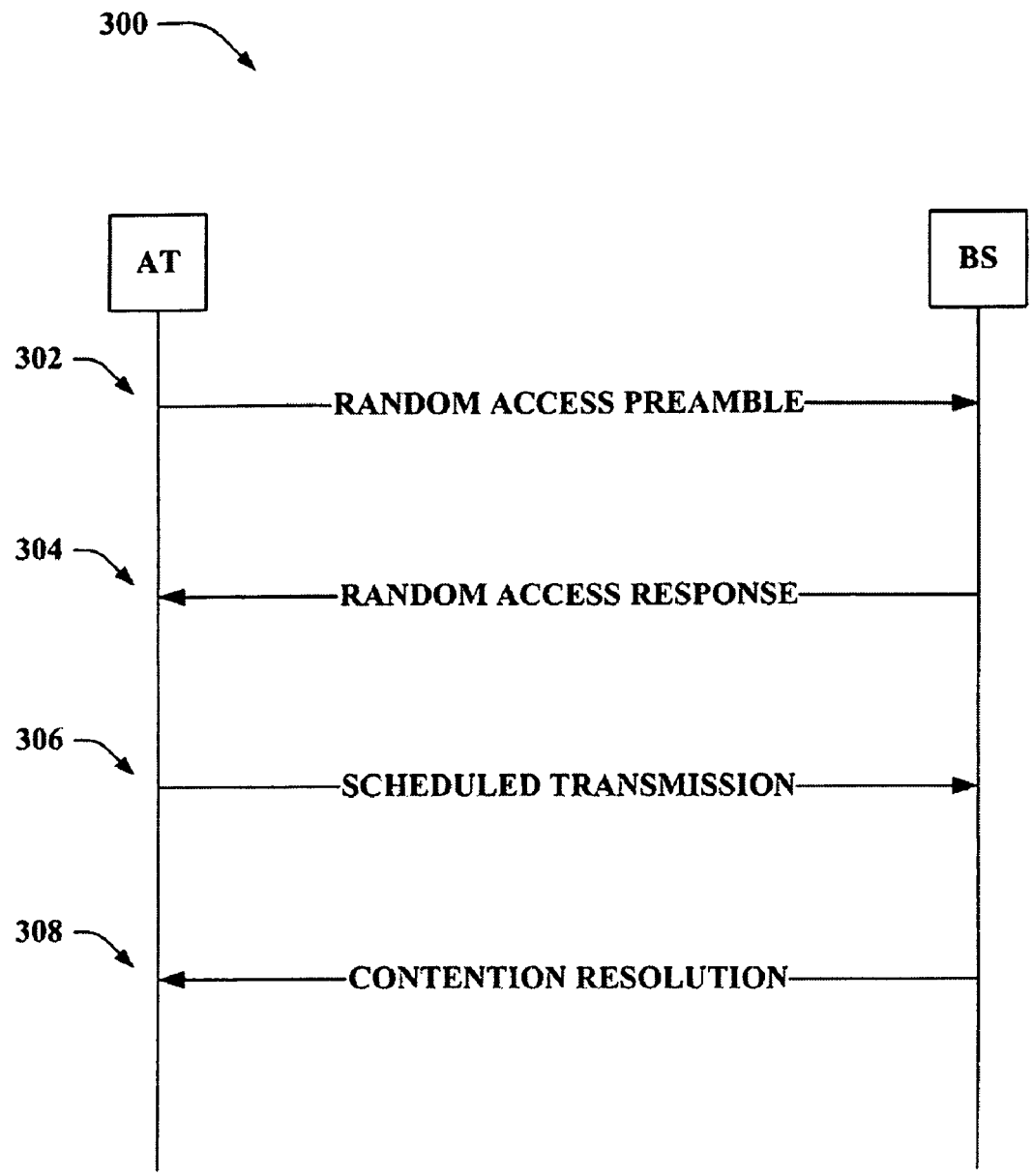
FIG. 3 is an illustration of an example signaling diagram of a basic random access procedure in accordance with various aspects of the subject disclosure.

Now referring to FIG. 3, illustrated is an example signaling diagram 300 of a basic random access procedure. The random access procedure can be effectuated between an access terminal (e.g., access terminal 202 of FIG. 2, . . . ) and a base station (e.g., base station 204 of FIG. 2, . . . ). At 302, the access terminal transmits a random access preamble to the base station. The random access preamble can be referred to as message 1. At 304, the base station transmits a random access response to the access terminal. The random access response can be referred to as message 2. At 306, the access terminal transmits a scheduled transmission to the base station in accordance with a grant provided by the random access response. The scheduled transmission can be referred to as message 3. Further, the scheduled transmission can be transmitted with Radio Link Control—Transparent Mode (RLC-TM). At 308, the base station transmits a contention resolution message to the access terminal. The contention resolution message can be referred to as message 4. Further, the contention resolution message can signify an end to the random access procedure.

Figure 4:
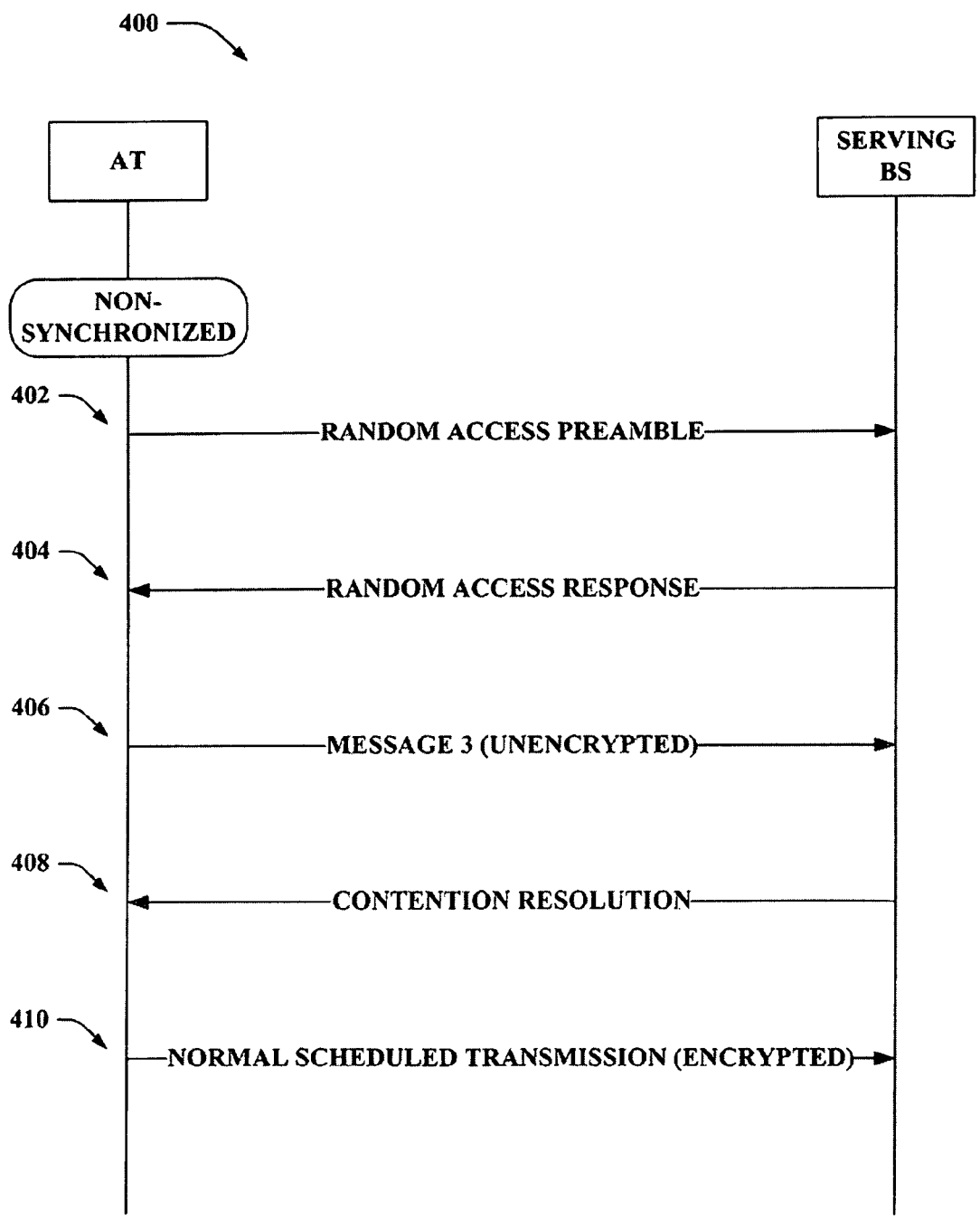
FIG. 4 is an illustration of an example signaling diagram of uplink Radio Resource Control (RRC) message transmission by a non-synchronized access terminal in accordance with various aspects of the subject disclosure.

Turning to FIG. 4, illustrated is an example signaling diagram 400 of uplink Radio Resource Control (RRC) message transmission by a non-synchronized access terminal. Signaling diagram 400 illustrates use of contention based random access for re-entry by the access terminal from a non-synchronized mode. At 402, the access terminal transmits a random access preamble to a serving base station. For instance, a common random access signature can be included as at least part of the random access preamble, and thus, the serving base station can be unable to determine the source of the random access preamble. At 404, a random access response can be sent by the serving base station to the access terminal. The random access response can be responsive to the random access preamble and/or can provide an uplink grant to the access terminal.

At 406, the access terminal can utilize the uplink grant to transmit message 3, which is unencrypted, to the serving base station. By way of example, message 3 can include an identifier corresponding to the access terminal. Further, message 3 can indicate to the serving base station that the procedure is for uplink data, message transmission, etc. (e.g., message 3 can include a message discriminator, ... ). At 408, in response to message 3, the serving base station can send a contention resolution message to the access terminal. For instance, the contention resolution message can include another uplink grant for the access terminal. Moreover, the contention resolution message can indicate to the access terminal that re-entry to synchronized mode has been completed and/or that the access terminal can employ encryption for subsequent uplink transmissions (e.g., the contention resolution message can signify an end to the random access procedure, ... ). At 410, the access terminal transmits a normal scheduled transmission message, which is encrypted, to the serving base station. For instance, the access terminal can utilize the uplink grant included in the contention resolution message for sending this encrypted message. In contrast to unencrypted message 3, which can include the identifier related to the access terminal and/or an indicator as to the type of data to be transmitted by the access terminal, the encrypted, normal scheduled transmission message can be an actual RRC message (e.g., measurement report, including security-critical information, ... ). Moreover, subsequent scheduled uplink transmissions from the access terminal to the serving base station while the access terminal remains in synchronized mode can similarly be encrypted.

Figure 5:
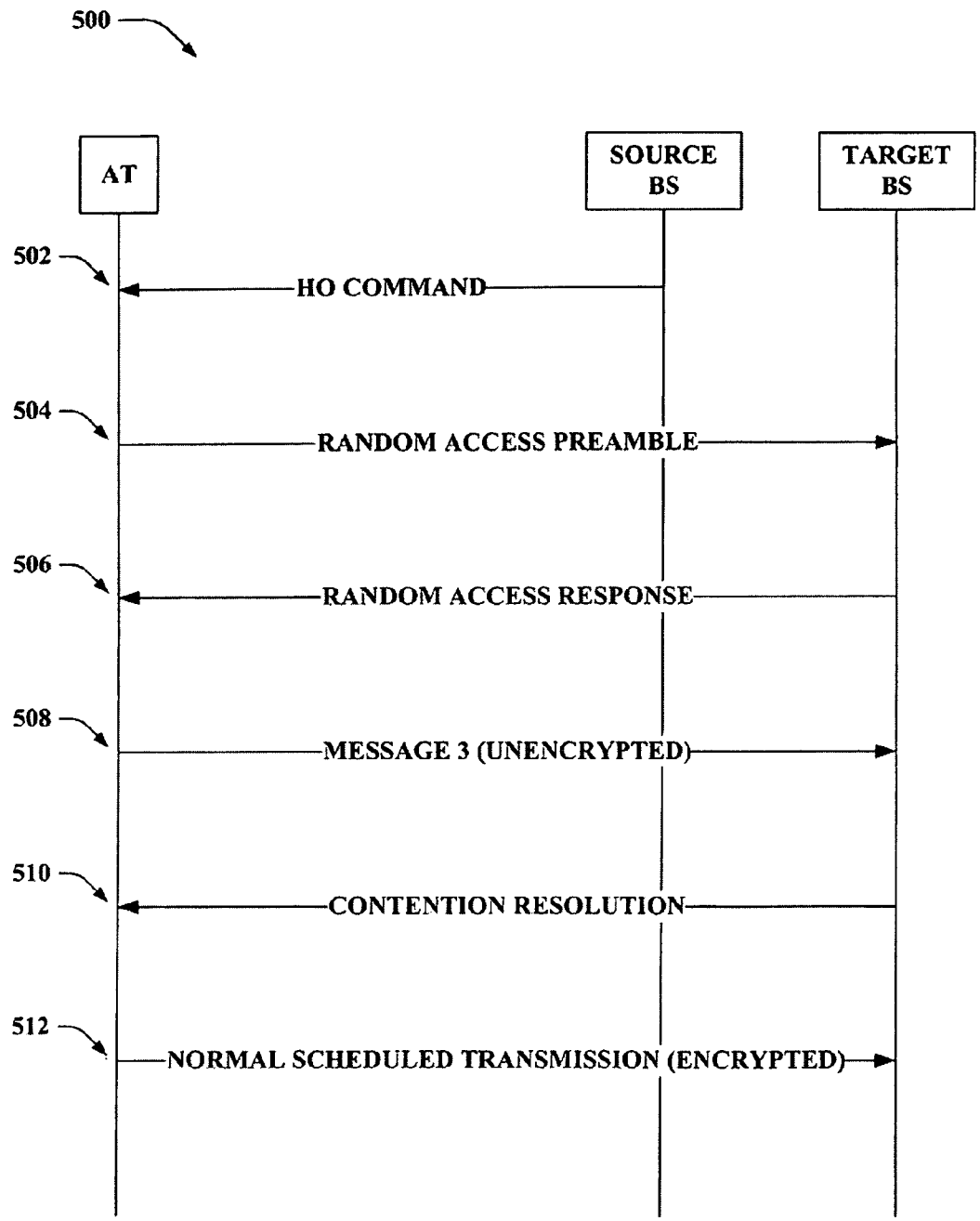
FIG. 5 is an illustration of an example signaling diagram showing a handover scenario in accordance with various aspects of the subject disclosure.

With reference to FIG. 5, illustrated is an example signaling diagram 500 showing a handover scenario. Handover can be effectuated such that an access terminal transitions from being served by a source base station to being served by a target base station. The handover can involve a security configuration change, which can cause the access terminal to send critical security related information to the target base station.

At 502, a handover command can be transmitted by the source base station to the access terminal. The handover command can initiate the access terminal to handover to the target base station. Further, although not shown, it is contemplated that the source base station can interact with the target base station prior to the access terminal beginning the random access procedure. For instance, the source base station can employ such interaction to transmit a security context associated with the access terminal to the target base station.

At 504, the access terminal transmits a random access preamble to the target base station in response to receiving the handover command from the source base station. Since contention based random access can be employed, the target base station can be unable to determine an identity of the source of the random access preamble. At 506, a random access response can be transmitted from the target base station to the access terminal. At 508, the access terminal transmits an unencrypted message 3 to the target base station in response to the received random access response. The unencrypted message 3 can be used by the access terminal for transmission of non-security-critical information (e.g., non-critical handover complete information, an identifier related to the access terminal such as a C-RNTI, a message discriminator, ... ). At 510, the target base station transmits a contention resolution message to the access terminal. At 512, the access terminal sends a normal scheduled transmission, which is encrypted, to the target base station. For instance, this encrypted, normal scheduled transmission can include security-critical information (e.g., handover complete critical information, ... ).

As shown in the examples from FIGS. 4 and 5, in contention based random access, message 3 can be unencrypted. Moreover, the access terminal can transmit non-critical information with the message 3 that is unencrypted. Further, the access terminal can utilize another message (e.g., normal scheduled transmission at 410 or 512, ... ) to transmit information that needs encryption after the contention based random access procedure. Moreover, in non-contention based random access, message 3 can be encrypted if security is active. Accordingly, the access terminal can perform different actions depending on type of random access procedure (e.g., encrypt or decrypted message 3 as a function of random access procedure type, include or exclude an identifier in message 3 as a function of random access procedure type, control information included in message 3 based upon the random access procedure type, delay security-critical information to be included in an encrypted message based upon the random access procedure type, ... ). Although the foregoing examples describe the entirety or most of message 3 being unencrypted for contention based random access, it is contemplated that a portion of message 3 can be unencrypted while a remainder of message 3 can be encrypted as described in the below examples.

Figure 6:
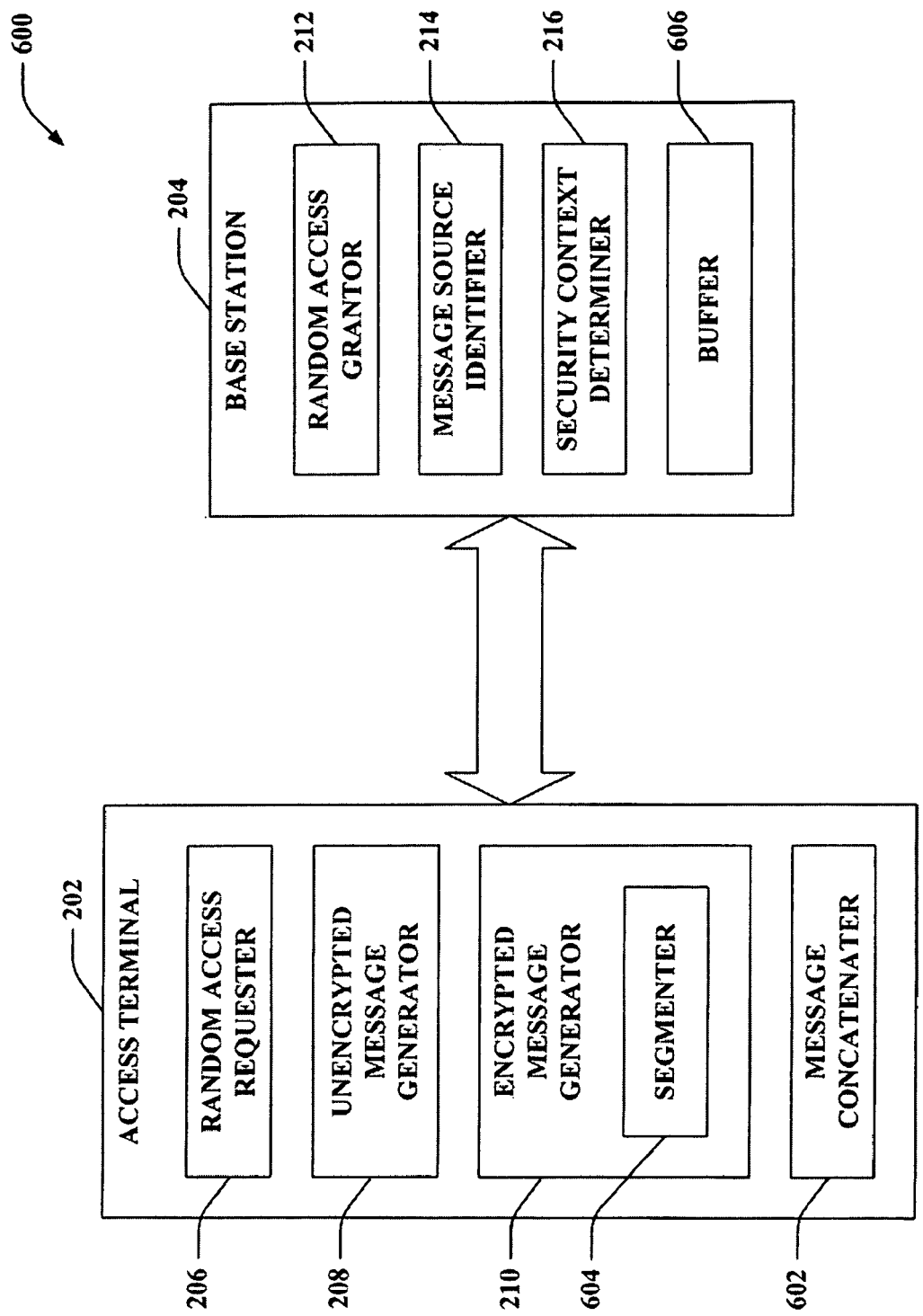
FIG. 6 is an illustration of an example system that sends encrypted and/or unencrypted messages as part of a random access procedure.

Referring to FIG. 6, illustrated is a system 600 that sends encrypted and/or unencrypted messages as part of a random access procedure. System 600 includes access terminal 202 and base station 204, where access terminal 202 can include random access requester 206, unencrypted message generator 208, and encrypted message generator 210 and base station 204 can include random access grantor 212, message source identifier 214, and security context determiner 216. Although not shown, it is to be appreciated that system 600 can include any number of additional access terminals similar to access terminal 202 and/or any number of additional base stations similar to base station 204.

According to an example, access terminal 202 can transmit a message 3 to base station 204 as part of a random access procedure as described herein. When contention based random access is employed, the message 3 sent by access terminal 202 can include an unencrypted portion (e.g., yielded by unencrypted message generator 208) and an encrypted portion (e.g., yielded by encrypted message generator 210). Access terminal 202 can include a message concatenater 602 that can combine the unencrypted portion provided by unencrypted message generator 208 and the encrypted portion provided by encrypted message generator 210 to yield the message 3. Further, the unencrypted portion of message 3 generated by unencrypted message generator 208 can include an identifier corresponding to access terminal 202, which can be used by message source identifier 214 to recognize access terminal 202 as the source of message 3. Thereafter, security context determiner 216 can recognize the security context associated with access terminal 202 based upon the determined identity, and the security context can be employed to decipher the encrypted portion of message 3 (as well as subsequent encrypted message(s)) yielded by the encrypted message generator 210 and sent by access terminal 202 to base station 204 over the uplink.

Further, Radio Link Control—Unacknowledged Mode (RLC-UM) and/or Radio Link Control—Acknowledged Mode (RLC-AM) can be used in message 3. RLC-UM does not provide feedback from the receiver side, whereas RLC- AM uses an acknowledgement from the receiver side (e.g., if an acknowledgement is not obtained at the transmitter side, then the transmitter can resend the packet(s), . . . ). Moreover, RLC-AM supports segmentation as described below. It is noted that except for the first RRC message at the LTE_IDLE to LTE_ACTIVE state transition, it is possible for access terminal 202 to use RLC-UM and RLC-AM in message 3. Accordingly, access terminal 202 can use non-transparent mode RLC for sending non-security-critical information, which is unencrypted. Additionally, message concatenater 602 can concatenate encrypted information within message 3.

It may complicate network behavior if access terminal 202 uses RLC-AM before message source identifier 214 identifies access terminal 202 as being the originator of message 3 due to RLC-AM having the context for access terminal 202. Thus, access terminal 202 can use RLC-UM with a special length indicator for the first RRC message for this reason since RLC-UM provides information on the RLC Protocol Data Unit (PDU) size. Moreover, it is contemplated that RLC-TM can be used if Medium Access Control (MAC) provides the size information for the RLC-TM PDU. Further, the normal RRC message that follows can use RLC-AM.

Encrypted message generator 210 can further include a segmenter 604. Since the size of message 3 can be limited, an encrypted message (e.g., RRC message, . . . ) yielded by encrypted message generator 210 may be unable to fit in the encrypted portion of message 3. Thus, segmenter 604 can segment this encrypted message (e.g., RRC message, . . . ) into separate parts, thereby enabling access terminal 202 to transfer a part of the encrypted message in the encrypted portion of message 3 and the remaining part of the encrypted message in a normal scheduled transmission.

Base station 204 can further include a buffer 606. Buffer 606 can be utilized to retain the encrypted portion of message 3 and onwards until the first unencrypted portion of message 3 is processed at the RRC layer in the network. Thus, the Packet Data Convergence Protocol (PDCP) layer in the network can be a stop and wait protocol at least for message 3. Thus, the above can enable transmission of message 3 with RLC-TM with rules on what access terminal 202 can transmit and no special handling for the RRC message transmission for subsequent RRC messages. Hence, there can be a reduction in Control-plane (C-plane) latency.

Further, in case of non-contention based random access, the random access requester 206 can send a random access preamble that allows message source identifier 214 (e.g., network, . . . ) to identify access terminal 202. It is therefore possible for access terminal 202 to encrypt the entirety of message 3 and for the network to use the correct security configuration for message 3. Moreover, as opposed to the contention based random access, access terminal 202 is not imposed a specific restriction as to what it can send in message 3 in this scenario.

According to an example, access terminal 202 can behave differently depending on the type of random access procedure (e.g., contention based versus non-contention based); however, the claimed subject matter is not so limited. For instance, where the entirety of message 3 is unencrypted for contention based random access per the example described in connection with FIGS. 2, 4, and 5, sending security critical information in message 3 in non-contention based random access can reduce C-plane latency compared to contention based random access. Under such scenario, allowing access terminal 202 to implement different behaviors as a function of random access procedure type can reduce latency for the non-contention based random access case. Following the example where message 3 includes an unencrypted portion and an encrypted portion as described in FIG. 6, different behaviors for contention based random access and non-contention based random access may or may not be utilized.

Figure 7:
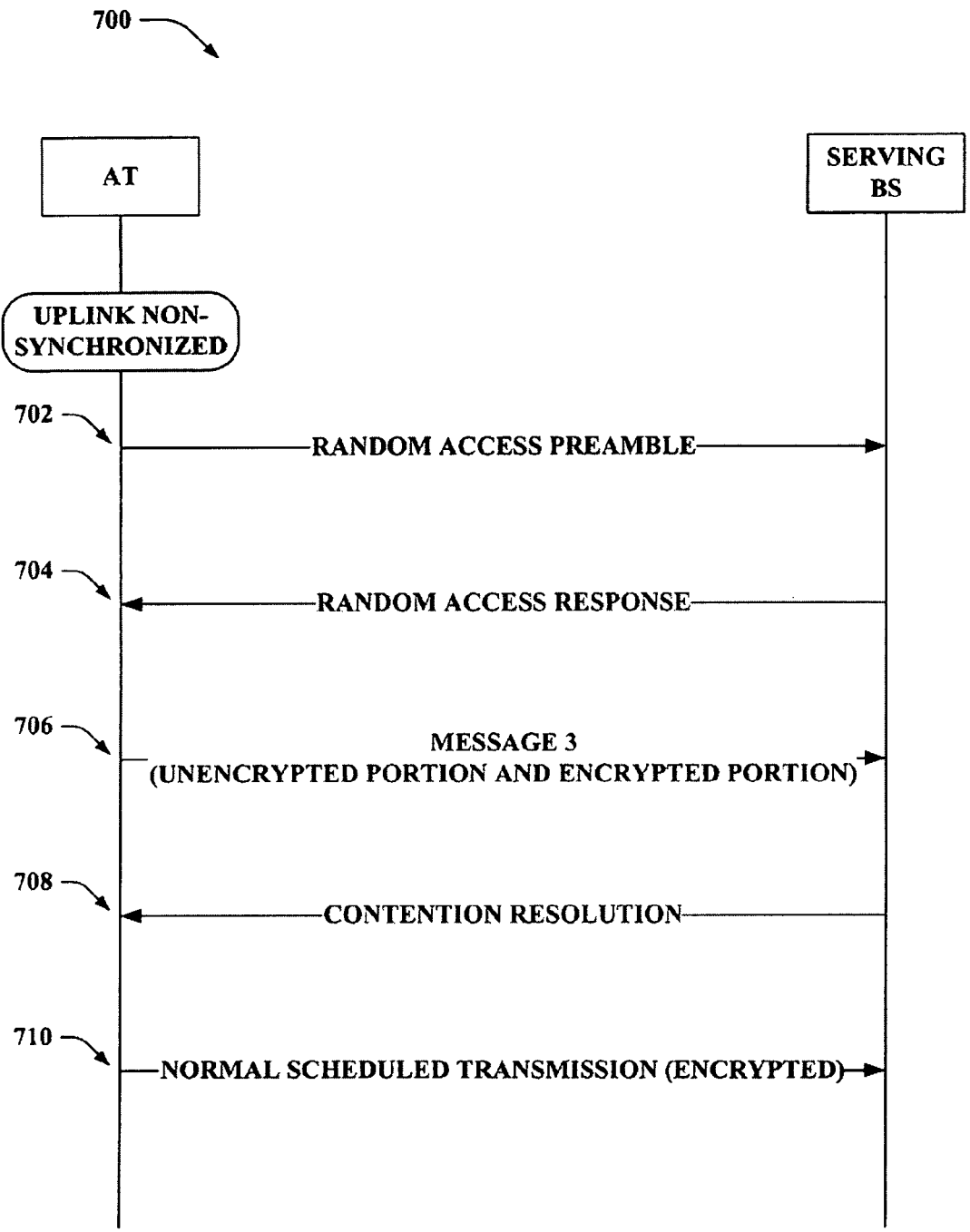
FIG. 7 is an illustration of an example signaling diagram of a random access procedure that communicates encrypted and unencrypted information in message 3 in accordance with various aspects of the subject disclosure.

Now turning to FIG. 7, illustrated is an example signaling diagram 700 of a random access procedure that communicates encrypted and unencrypted information in message 3. Signaling diagram 700 depicts use of random access by an access terminal to re-enter synchronized mode from non-synchronized mode. However, it is to be appreciated that signaling similar to the below description can be utilized in conjunction with handover from a source base station to a target base station (e.g., signaling described in diagram 700 can be effectuated between the target base station and the access terminal upon the access terminal receiving a handover command from the source base station as shown in FIG. 5, . . . ).

At 702, a random access preamble can be transmitted from the access terminal to the serving base station. At 704, a random access response can be transmitted by the serving base station to the access terminal. At 706, message 3 can be transmitted from the access terminal to the serving base station. Message 3 can include an unencrypted portion and an encrypted portion. The unencrypted portion can include an identifier (e.g., C-RNTI, . . . ) associated with the access terminal, a message discriminator, a special length indicator for the unencrypted portion of message 3, and so forth. For instance, the unencrypted portion can be sent using RLC-UM. According to another illustration, the unencrypted portion can be transmitted using RLC-TM. By way of further example, a MAC layer PDU can be used for the unencrypted portion of message 3. Further, an RRC message that includes security-critical information such as a measurement report (or a portion thereof) can be transmitted in the encrypted portion of message 3. The encrypted portion can be sent using RLC-AM, which supports segmentation. For instance, this measurement report can be segmented such that a first part of the measurement report can be concatenated with the unencrypted portion and sent as message 3, while a remainder of the measurement report can be sent in subsequent uplink transmission(s). At 708, a contention resolution message can be transmitted by the serving base station to the access terminal. At 710, a normal scheduled transmission, which is encrypted, can be sent by the access terminal to the serving base station. This normal scheduled transmission can include the remainder of the measurement report. Moreover, the normal scheduled transmission can be sent using RLC-AM.

According to an example, signaling as shown in diagram 700 can be utilized for both contention based random access and non-contention based random access (e.g., message 3 can include an unencrypted portion and an encrypted portion for both contention based random access and non-contention based random access, . . . ). Pursuant to another illustration, signaling diagram 700 can be employed for contention based random access, while different signaling can be used for non-contention based random access. Following this illustration, for non-contention based random access, the entirety or most of message 3 can be encrypted and/or can be sent using RLC-AM rather than encrypting and/or using RLC-AM for only a portion of message 3.

Figure 8:
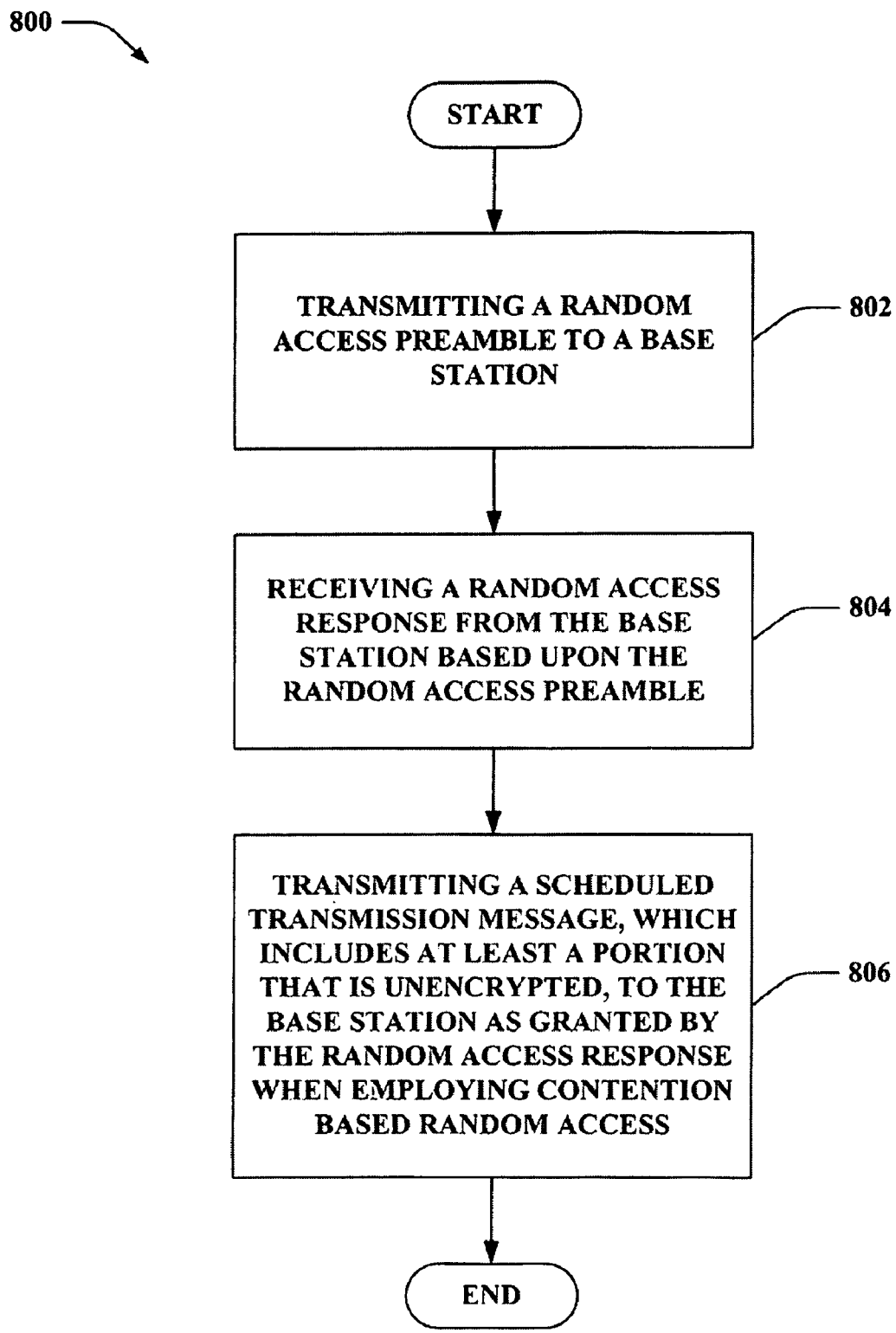
FIG. 8 is an illustration of an example methodology that facilitates employing a random access procedure in a wireless communication environment.
Figure 9:
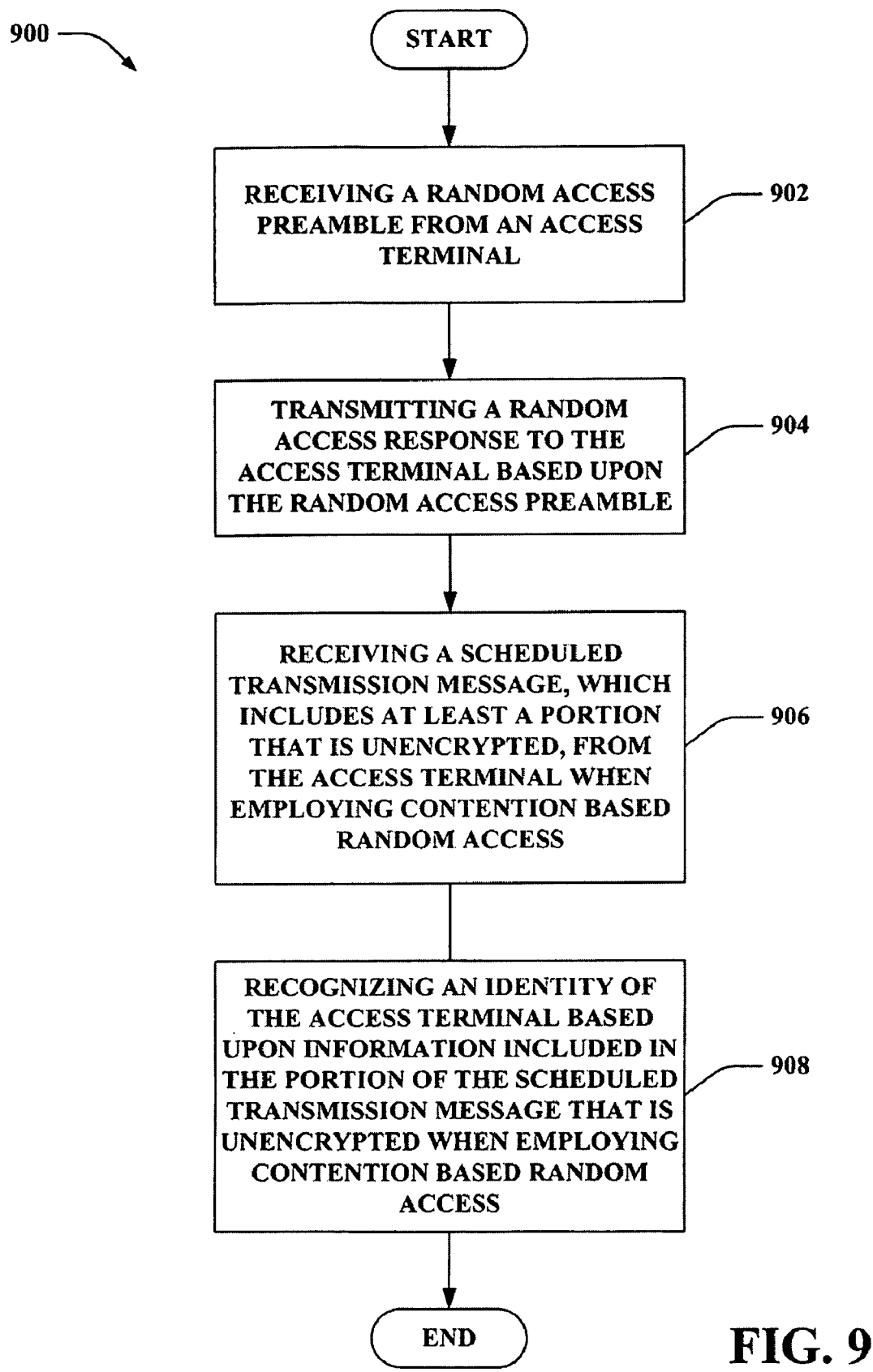
FIG. 9 is an illustration of an example methodology that facilitates deciphering data obtained during a random access procedure in a wireless communication environment.

Referring to FIGS. 8-9, methodologies relating to utilizing encrypted and unencrypted messages for a random access procedure in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 8, illustrated is a methodology 800 that facilitates employing a random access procedure in a wireless communication environment. At 802, a random access preamble can be transmitted to a base station. For instance, the random access preamble can include a random access signature that is commonly utilized by access terminals in the wireless communication environment (e.g., the common random access signature can be used for contention based random access, According to another illustration, the random access preamble can include an access terminal specific random access signature (e.g., used for non-contention based random access, . . . ). The random access preamble can be sent to the base station to begin initial access or re-entry from non-synchronized state, for instance. Per a further example, the random access preamble can be transmitted to the base station (e.g., target base station) in response to receiving a handover command from a disparate, source base station.

At 804, a random access response can be received from the base station based upon the random access preamble. The random access response can provide a grant for a subsequent uplink, scheduled transmission.

At 806, a scheduled transmission message, which includes at least a portion that is unencrypted, can be transmitted to the base station as granted by the random access response when employing contention based random access. According to an illustration, the unencrypted portion can include a temporary identifier (e.g. Cell Radio Network Temporary Identifier (C-RNTI), . . . ) of the access terminal from which the scheduled transmission is transmitted. The temporary identifier can enable the base station to recognize an identity of the access terminal, determine a security context associated with the access terminal, and employ such security context for decrypting subsequent uplink transmission(s) from the access terminal. Further, the unencrypted portion can include non-security-critical information (e.g. a message discriminator, . . . ). Moreover, a contention resolution message can be received from the base station in response to the scheduled transmission message.

According to an example, all or substantially most of the scheduled transmission message can be unencrypted when employing contention based random access. Moreover, this scheduled transmission message can be transmitted with Radio Link Control—Transparent Mode (RLC-TM); however, the claimed subject matter is not so limited. Further, a subsequent normal scheduled transmission message, which is encrypted, can be sent to the base station after receiving the contention resolution message from the base station. This subsequent normal scheduled transmission message can include security-critical information (e.g., critical data related to a Radio Resource Control (RRC) measurement report, handover completion, handover failure, . . . ). Further, when non-contention based random access is employed per this example, the scheduled transmission message can be encrypted. Thus, the type of random access procedure being utilized can be identified, and whether the scheduled transmission message sent in response to the grant included in the random access response is encrypted or unencrypted can vary depending on the identified type of random access procedure.

By way of another example, the scheduled transmission message can include the unencrypted portion and an encrypted portion when employing contention based random access. Thus, the unencrypted portion and the encrypted portion can be concatenated within the scheduled transmission message. For instance, the unencrypted portion can be transmitted with Radio Link Control—Unacknowledged Mode (RLC-UM) or RLC-TM while the encrypted portion can be transmitted with Radio Link Control—Acknowledged Mode (RLC-AM). Further, the unencrypted portion can include non-security-critical information and the encrypted portion can include security-critical information (e.g., critical data related to a Radio Resource Control (RRC) measurement report, handover completion, handover failure, . . . ). The non-security-critical information, for instance, can include a special length indicator with RLC-UM. According to another illustration, the Medium Access Control (MAC) layer Protocol Data Unit (PDU) can be used in place of RLC-UM. Moreover, the security-critical information included in the encrypted portion can be segmented such that a first part is included in the encrypted portion of the scheduled transmission message and the remainder is included in at least one subsequent normal scheduled transmission message that is encrypted and sent to the base station after receiving the contention resolution message. Further, following this example, it is contemplated that similar use of the unencrypted portion and the encrypted portion for the scheduled transmission message sent in response to the grant included in the random access response can be employed when non-contention based random access is employed (e.g., similar access terminal behavior for both contention based random access and non-contention based random access). Additionally or alternatively, non-contention based random access can yield differing behavior for such scheduled transmission message whereby all or substantially most of the scheduled transmission message (e.g., message 3, . . . ) is encrypted.

Turning to FIG. 9, illustrated is a methodology 900 that facilitates deciphering data obtained during a random access procedure in a wireless communication environment. At 902, a random access preamble can be received from an access terminal. The random access preamble can include a common random access signature (e.g., for contention based random access, . . . ), and thus, the identity of the access terminal can be unable to be recognized. Further, for non-contention based random access, the random access preamble can include a random access signature that is unique to the access terminal from which the random access preamble was obtained. At 904, a random access response can be transmitted to the access terminal based upon the random access preamble. At 906, a scheduled transmission, which includes at least a portion that is unencrypted, can be received from the access terminal when employing contention based random access. For instance, the unencrypted portion can include an identifier of the access terminal (e.g., Cell Radio Network Temporary Identifier (C-RNTI), . . . ). By way of another illustration, for non-contention based random access, the scheduled transmission can be encrypted; however, the claimed subject matter is not so limited (e.g., similar access terminal behavior can be employed for contention based random access and non-contention based random access, . . . ). Moreover, a contention resolution message can be sent to the access terminal in response to the received, scheduled transmission. At 908, an identity of the access terminal can be recognized based upon information included in the portion of the scheduled transmission that is unencrypted when employing contention based random access. Further, a security context of the access terminal can be determined based upon the recognized identity of the access terminal. Moreover, this security context can be used to decipher subsequent encrypted information obtained from the access terminal. For example, the subsequent encrypted information can be included in an encrypted portion of the scheduled transmission message (as well as a subsequent normal scheduled transmission message that is encrypted). Following this example, the encrypted portion of the scheduled transmission message (and/or the subsequent normal scheduled transmission message) can be buffered until the unencrypted portion is processed (e.g. to determine the identity of the access terminal, . . . ). According to another example, the subsequent encrypted information can be included in a subsequent normal scheduled transmission message.

It will be appreciated that, in accordance with one or more aspects described herein, inferences can be made regarding employing encrypted and/or unencrypted scheduled uplink messages in a random access procedure. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining a type of random access procedure to be employed. By way of further illustration, an inference can be made related to determining whether to alter encryption operation for message 3 as a function of the type of random access procedure being utilized. It will be appreciated that the foregoing examples are illustrative in nature and are not intended to limit the number of inferences that can be made or the manner in which such inferences are made in conjunction with the various embodiments and/or methods described herein.

Figure 10:
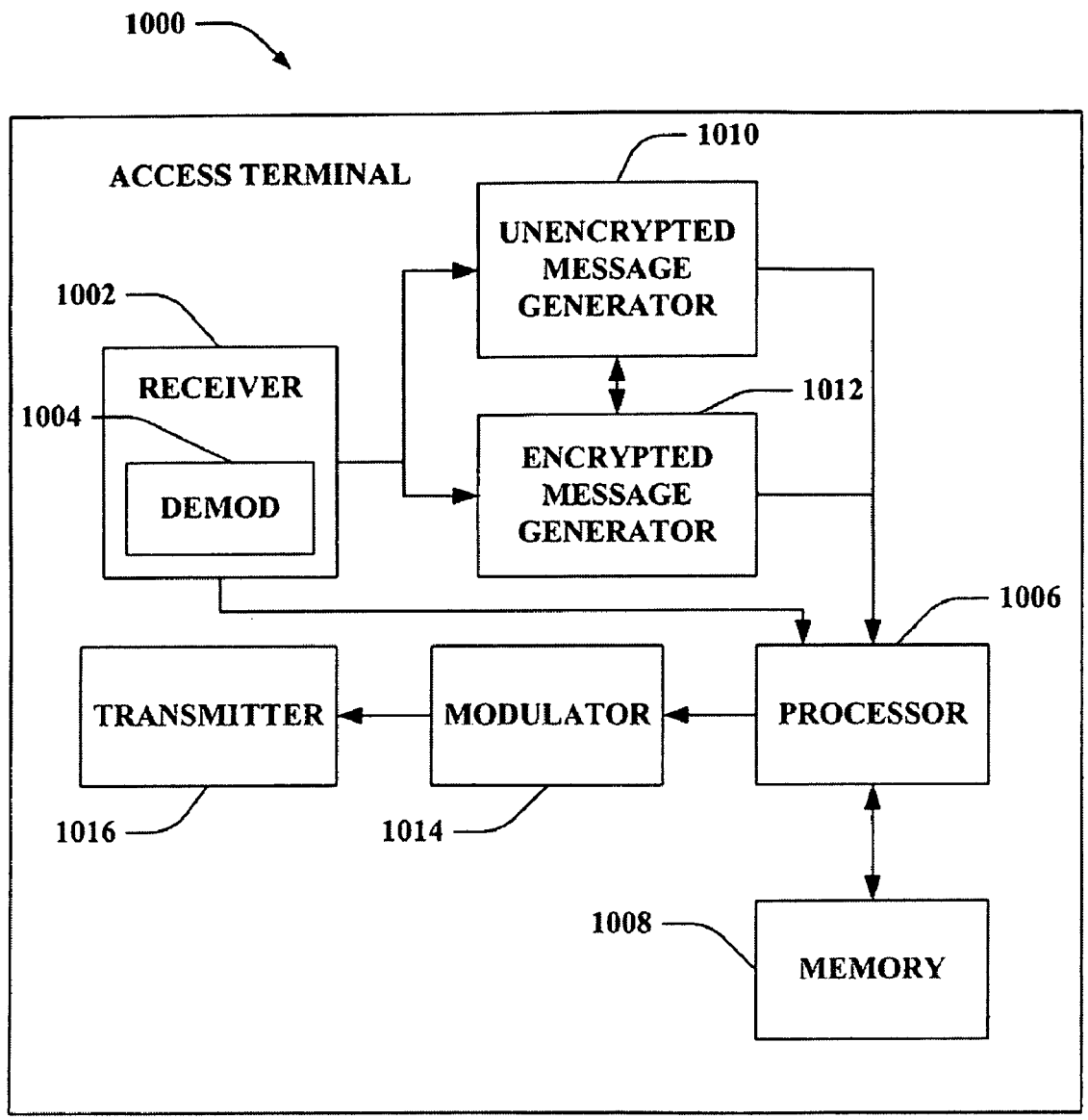
FIG. 10 is an illustration of an example access terminal that transmits encrypted and/or unencrypted scheduled uplink messages in a wireless communication system.

FIG. 10 is an illustration of an access terminal 1000 that transmits encrypted and/or unencrypted scheduled uplink messages in a wireless communication system. Access terminal 1000 comprises a receiver 1002 that receives a signal from, for instance, a receive antenna (not shown), and performs typical actions thereon (e.g. filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of access terminal 1000, and/or a processor that both analyzes information received by receiver 1002, generates information for transmission by transmitter 1016, and controls one or more components of access terminal 1000.

Access terminal 1000 can additionally comprise memory 1008 that is operatively coupled to processor 1006 and that can store data to be transmitted, received data, and any other suitable information related to performing the various actions and functions set forth herein. For instance, memory 1008 can store an identifier related to access terminal 1000, a random access signature to include in a random access preamble, and so forth. Memory 1008 can additionally store protocols and/or algorithms associated with determining a type of random access procedure to employ, generating a random access preamble to transmit to a base station, generating uplink messages, concatenating encrypted and unencrypted messages, and the like.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to an unencrypted message generator 1010 and/or an encrypted message generator 1012, which can be substantially similar to unencrypted message generator 208 of FIG. 2 and encrypted message generator 210 of FIG. 2, respectively. Unencrypted message generator 1010 and/or encrypted message generator 1012 can yield a message 3 for transmission over an uplink to a base station. For instance, access terminal 1000 can transmit a random access preamble and receive a random access response based thereupon. When employing contention based random access, unencrypted message generator 1010 can yield at least a portion of message 3 for transmission over the uplink, and this portion is unencrypted. According to an example, message 3 can be generated by unencrypted message generator 1010, and thus, can be unencrypted. Pursuant to another illustration, the unencrypted message generator 1010 can yield the unencrypted portion of message 3, while encrypted message generator 1012 can yield an encrypted portion of message 3. Moreover, a subsequent uplink normal scheduled transmission message can be provided by encrypted message generator 1012. Further, unencrypted message generator 1010 can include non-security-critical information such as, for instance, an identifier related to access terminal 1000, a message discriminator, etc. in the unencrypted messages, while encrypted message generator 1012 can include security-critical information in encrypted messages. Access terminal 1000 still further comprises a modulator 1014 and a transmitter 1016 that transmits the signal to, for instance, a base station, another access terminal, etc. Although depicted as being separate from the processor 1006, it is to be appreciated that unencrypted message generator 1010, encrypted message generator 1012 and/or modulator 1014 can be part of processor 1006 or a number of processors (not shown).

Figure 11:
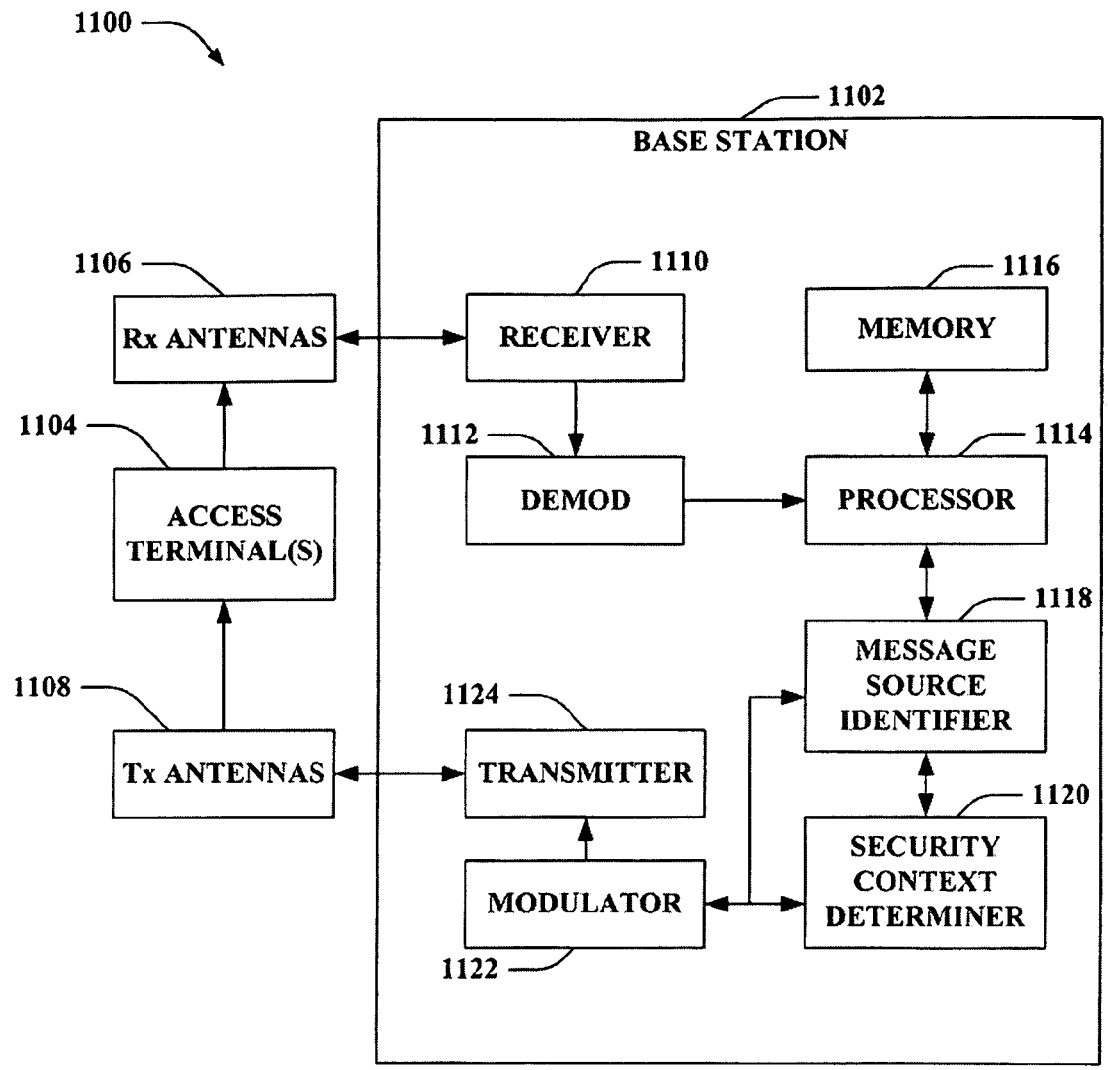
FIG. 11 is an illustration of an example system that evaluates unencrypted and/or encrypted scheduled messages received over an uplink during a random access procedure in a wireless communication environment.

FIG. 11 is an illustration of a system 1100 that evaluates unencrypted and/or encrypted scheduled messages received over an uplink during a random access procedure in a wireless communication environment. System 1100 comprises a base station 1102 (e.g., access point, . . . ) with a receiver 1110 that receives signal(s) from one or more access terminals 1104 through a plurality of receive antennas 1106, and a transmitter 1122 that transmits to the one or more access terminals 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores data to be transmitted to or received from access terminal(s) 1104 (or a disparate base station (not shown)) and/or any other suitable information related to performing the various actions and functions set forth herein. Processor 1114 is further coupled to a message source identifier 1118 that evaluates a received message 3 that includes at least an unencrypted portion from a particular one of access terminal(s) 1104 to recognize an identity of that particular access terminal. Such message 3 can be received when the particular access terminal employs a contention based random access; however, the claimed subject matter is not so limited. Message source identifier 1118 can be operatively coupled to a security context determiner 1120 that deciphers a security context corresponding to the identified, particular access terminal from which the message 3 was obtained. Moreover, the security context as identified can be employed to decipher subsequent encrypted scheduled uplink transmissions. It is contemplated that message source identifier 1118 can be substantially similar to message source identifier 214 of FIG. 2 and/or security context determiner 1120 can be substantially similar to security context determiner 216 of FIG. 2. Further, message source identifier 1118 and/or security context determiner 1120 can provide information to be transmitted to a modulator 1122. Modulator 1122 can multiplex a frame for transmission by a transmitter 1126 through antennas 1108 to access terminal(s) 1104. Although depicted as being separate from the processor 1114, it is to be appreciated that message source identifier 1118, security context determiner 1120 and/or modulator 1122 can be part of processor 1114 or a number of processors (not shown).

Figure 12:
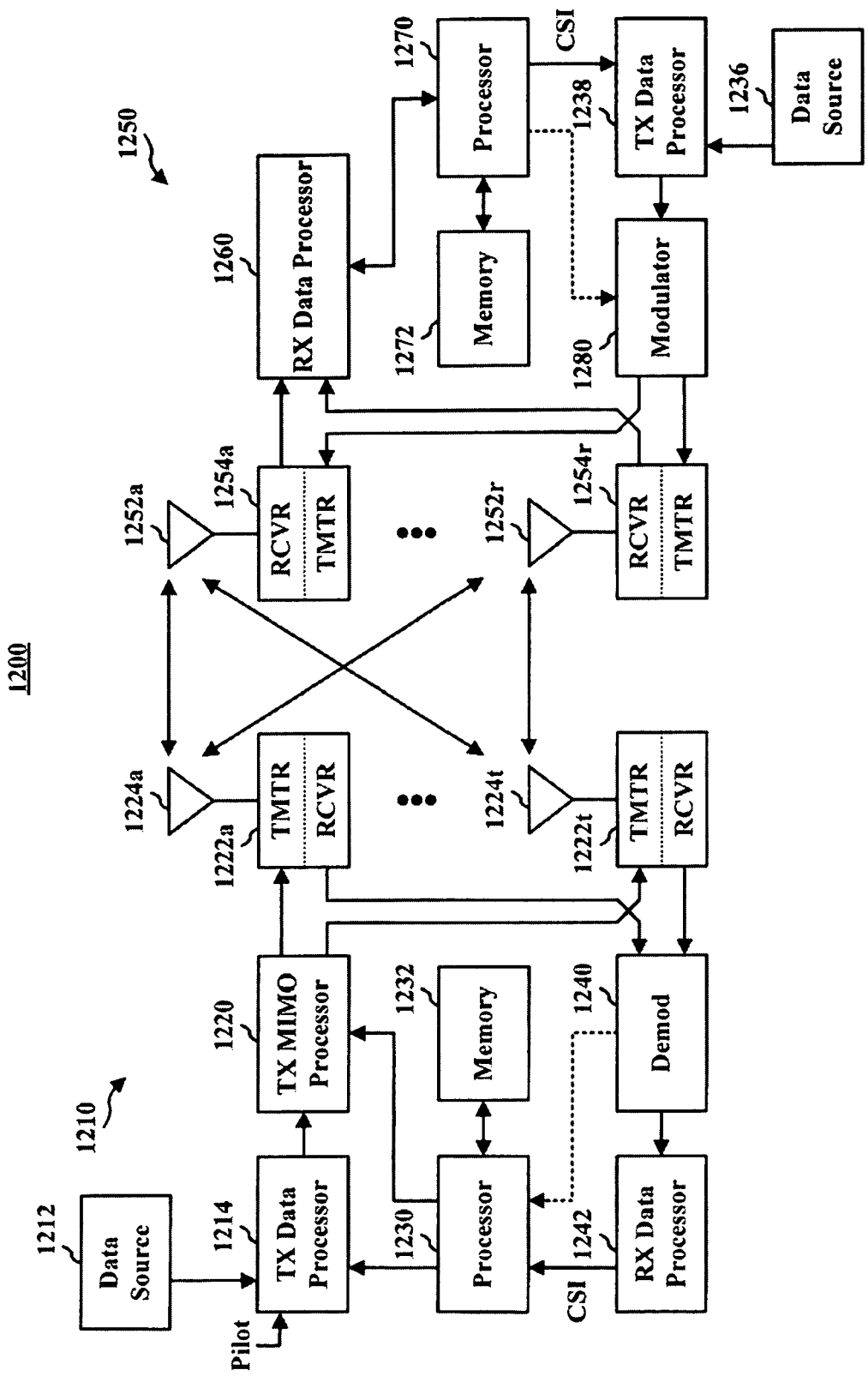
FIG. 12 is an illustration of an example wireless network environment that can be employed in conjunction with the various systems and methods described herein.

FIG. 12 shows an example wireless communication system 1200. The wireless communication system 1200 depicts one base station 1210 and one access terminal 1250 for sake of brevity. However, it is to be appreciated that system 1200 can include more than one base station and/or more than one access terminal, wherein additional base stations and/or access terminals can be substantially similar or different from example base station 1210 and access terminal 1250 described below. In addition, it is to be appreciated that base station 1210 and/or access terminal 1250 can employ the systems (FIGS. 1, 2, 6, 10-11, and 13-14) and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At access terminal 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which available technology to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from access terminal 1250 are received by antennas 1224, conditioned by receivers 1222, demodulated by a demodulator 1240, and processed by a RX data processor 1242 to extract the reverse link message transmitted by access terminal 1250. Further, processor 1230 can process the extracted message to determine which precoding matrix to use for determining the beamforming weights.

Processors 1230 and 1270 can direct (e.g., control, coordinate, manage, etc.) operation at base station 1210 and access terminal 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
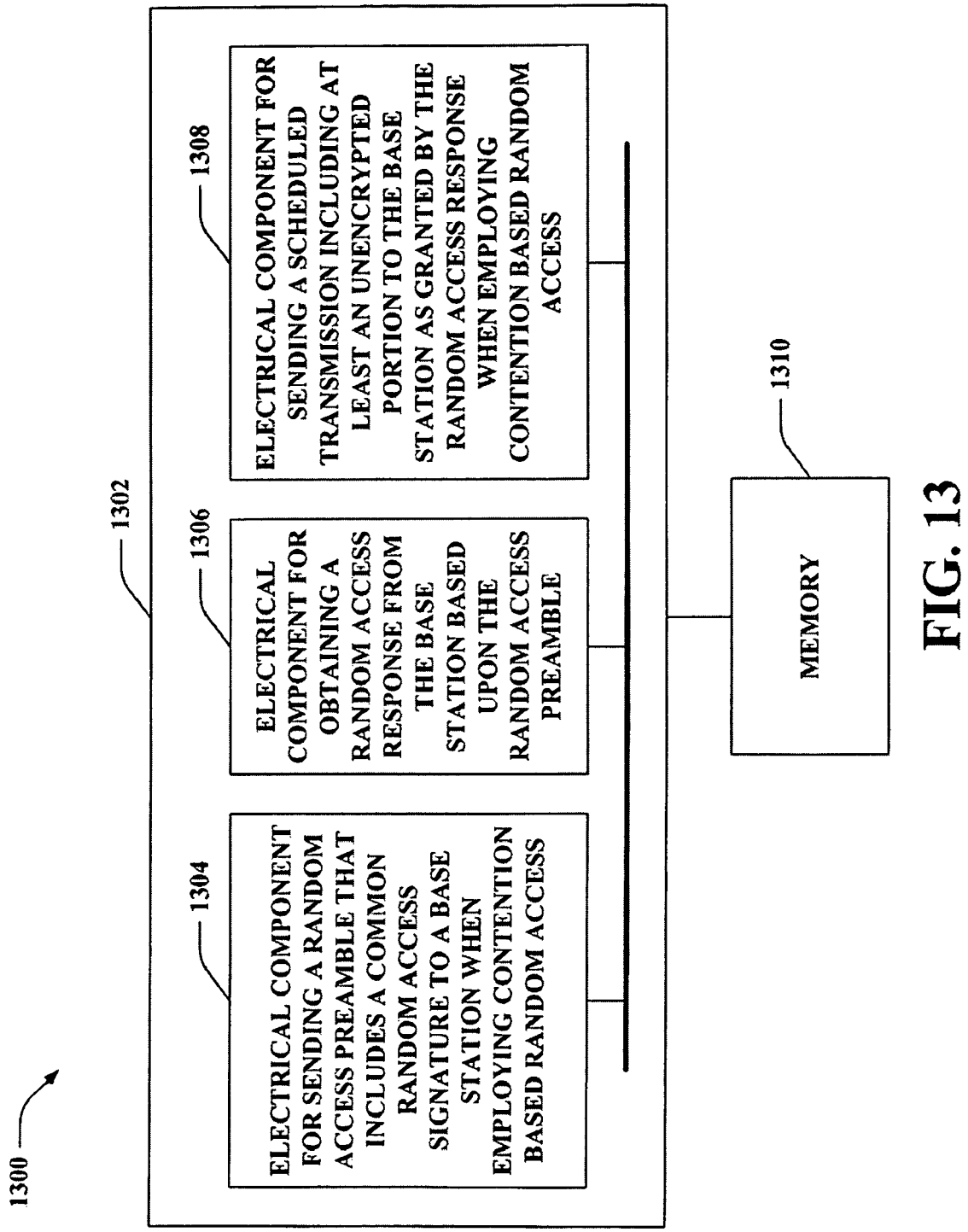
FIG. 13 is an illustration of an example system that enables utilizing a random access procedure in a wireless communication environment.

With reference to FIG. 13, illustrated is a system 1300 that enables utilizing a random access procedure in a wireless communication environment. For example, system 1300 can reside within an access terminal. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for sending a random access preamble that includes a common random access signature to a base station when employing contention based random access 1304. Further, although not shown, logical grouping 1302 can include an electrical component for sending a random access preamble that includes an access terminal specific random access signature to the base station when employing non-contention based random access. Moreover, logical grouping 1302 can include an electrical component for obtaining a random access response from the base station based upon the random access preamble 1306. Further, logical grouping 1302 can include an electrical component for sending a scheduled transmission including at least an unencrypted portion to the base station as granted by the random access response when employing contention based random access 1308. For instance, both the unencrypted portion and an encrypted portion can be sent as part of the scheduled transmission. By way of another illustration, the scheduled transmission can be unencrypted, and a subsequent normal scheduled transmission can be encrypted. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
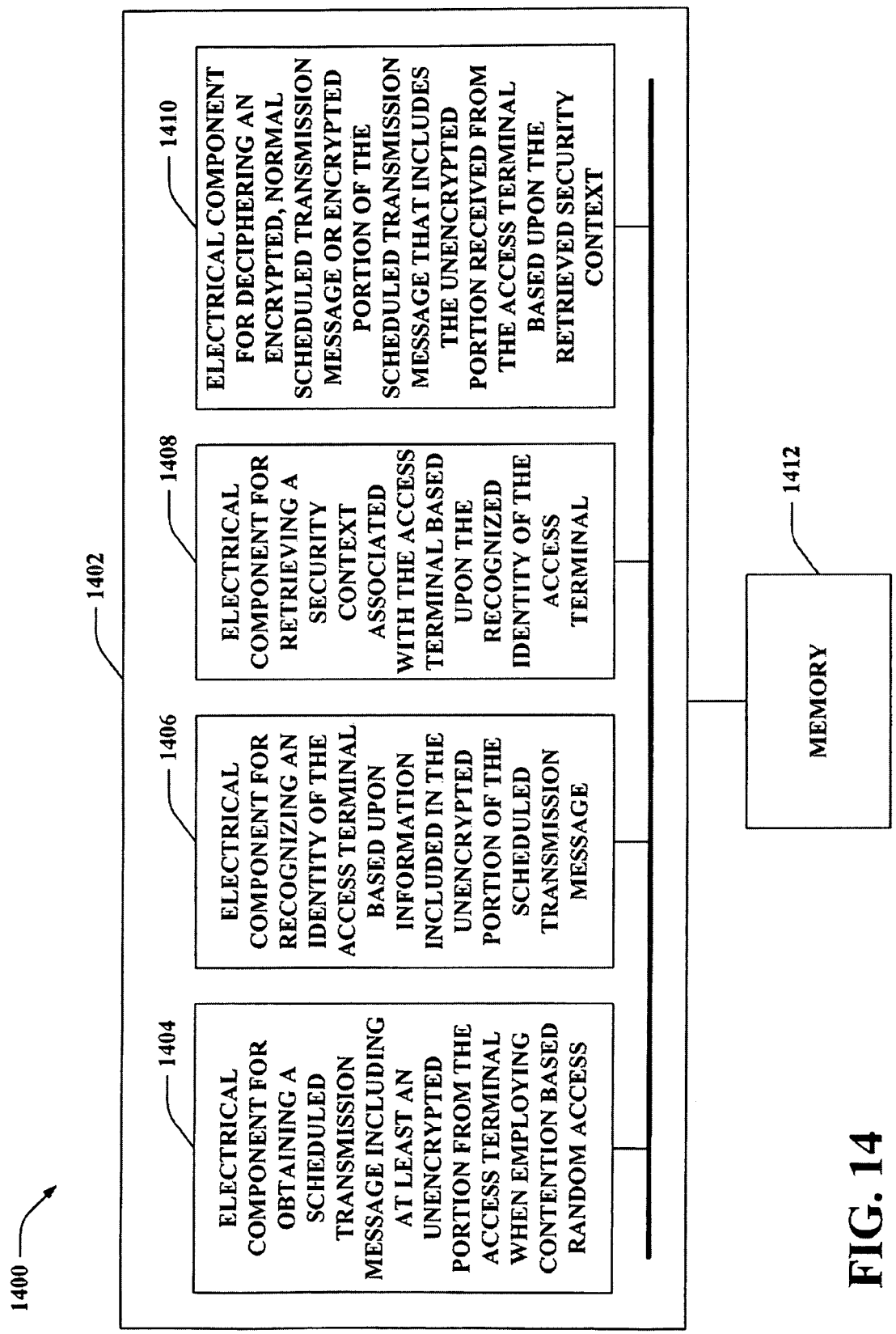
FIG. 14 is an illustration of an example system that enables employing a random access procedure in a wireless communication environment.

Turning to FIG. 14, illustrated is a system 1400 that enables employing a random access procedure in a wireless communication environment. System 1400 can reside at least partially within a base station, for instance. As depicted, system 1400 includes functional blocks that can represent functions implemented by a processor, software, or combination thereof (e.g. firmware). System 1400 includes a logical grouping 1402 of electrical components that can act in conjunction. Logical grouping 1402 can include an electrical component for obtaining a scheduled transmission message including at least an unencrypted portion from the access terminal when employing contention based random access 1404. Further, logical grouping 1402 can include an electrical component for recognizing an identity of the access terminal based upon information included in the unencrypted portion of the scheduled transmission message 1406. For instance, the unencrypted portion of the scheduled transmission message can include an identifier related to the access terminal. Moreover, logical grouping 1402 can include an electrical component for retrieving a security context associated with the access terminal based upon the recognized identity of the access terminal 1408. Further, logical grouping 1402 can include an electrical component for deciphering an encrypted, normal scheduled transmission message or encrypted portion of the scheduled transmission message that includes the unencrypted portion received from the access terminal based upon the retrieved security context 1410. Additionally, system 1400 can include a memory 1412 that retains instructions for executing functions associated with electrical components 1404, 1406, 1408, and 1410. While shown as being external to memory 1412, it is to be understood that electrical components 1404, 1406, 1408, and 1410 can exist within memory 1412.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates employing a random access procedure in a wireless communication environment, comprising:
    transmitting a random access preamble to a base station;
    receiving a random access response from the base station based upon the random access preamble; and
    transmitting a scheduled transmission message, which includes an encrypted portion and an unencrypted portion, to the base station as granted by the random access response and before receiving a contention resolution message from the base station when employing contention based random access.

2. The method of claim 1, further comprising transmitting the random access preamble for at least one of initial access, re-entry from non-synchronized state, or handover from a source base station to the base station.

3. The method of claim 1, wherein the unencrypted portion of the scheduled transmission message includes non-security-critical information and an access terminal specific temporary identifier that enables the base station to recognize a source of the random access preamble and the scheduled transmission message.

4. The method of claim 1, further comprising transmitting the scheduled transmission message as an encrypted message when employing non-contention based random access.

5. The method of claim 1, further comprising:
    identifying a type of random access procedure being employed; and
    determining whether or not to encrypt the entire scheduled transmission message depending on the identified type of random access procedure.

6. The method of claim 1, further comprising receiving a contention resolution message from the base station in response to the scheduled transmission message.

7. The method of claim 6, further comprising transmitting an encrypted subsequent normal transmission message in response to the received contention resolution message, the encrypted subsequent normal transmission message includes security-critical information.

8. The method of claim 6, further comprising concatenating the unencrypted portion with the encrypted portion within the scheduled transmission message.

9. The method of claim 8, further comprising:
    transmitting the unencrypted portion of the scheduled transmission message with at least one of Radio Link Control—Unacknowledged Mode (RLC-UM) or Radio Link Control—Transparent Mode (RLC-TM); and
    transmitting the encrypted portion of the scheduled transmission message with Radio Link Control—Acknowledgement Mode (RLC-AM).

10. The method of claim 8, wherein the unencrypted portion of the scheduled transmission message includes non-security-critical information including an access terminal specific temporary identifier and the encrypted portion of the scheduled transmission message includes security-critical information.

11. The method of claim 8, wherein the unencrypted portion uses a Medium Access Control (MAC) layer Protocol Data Unit (PDU).

12. The method of claim 8, further comprising employing the unencrypted portion and the encrypted portion of the scheduled transmission message when using non-contention based random access.

13. A method that facilitates employing a random access procedure in a wireless communication environment, comprising:
    transmitting a random access preamble to a base station;
    receiving a random access response from the base station based upon the random access preamble;
    concatenating an unencrypted portion with an encrypted portion to form a scheduled transmission message, wherein the unencrypted portion of the scheduled transmission message includes non-security-critical information including an access terminal specific temporary identifier, and the encrypted portion of the scheduled transmission message incorporating a first segmented part of security-critical information;
    transmitting the scheduled transmission message to the base station as granted by the random access response when employing contention based random access;
    receiving a contention resolution message from the base station in response to the scheduled transmission message; and
    transmitting an encrypted subsequent normal scheduled transmission message to the base station after receiving the contention resolution message, the encrypted normal scheduled transmission message incorporating at least a second segmented part of the security-critical information.

14. A wireless communications apparatus, comprising:
    a memory that retains instructions related to transmitting a random access preamble to a base station for at least one of initial access, re-entry from non-synchronized state, or handover from a source base station to the base station, receiving a random access response from the base station based upon the random access preamble, transmitting a scheduled transmission message, which includes an encrypted portion and an unencrypted portion, to the base station as granted by the random access response and before receiving a contention resolution message from the base station when employing contention based random access, and receiving a contention resolution message from the base station in response to the scheduled transmission message; and a processor, coupled to the memory, configured to execute the instructions retained in the memory.

15. The wireless communications apparatus of claim 14, wherein the unencrypted portion of the scheduled transmission message includes non-security-critical information and an access terminal specific temporary identifier that enables the base station to recognize a source of the random access preamble and the scheduled transmission message.

16. The wireless communications apparatus of claim 14, wherein the memory further retains instruction related to transmitting an encrypted subsequent normal transmission message in response to the received contention resolution message, the encrypted subsequent normal transmission message includes security-critical information.

17. The wireless communications apparatus of claim 14, wherein the memory further retains instruction related to transmitting the scheduled transmission message as an encrypted message when employing non-contention based random access.

18. The wireless communications apparatus of claim 14, wherein the memory further retains instruction related to identifying a type of random access procedure being employed and determining whether or not to encrypt the entire scheduled transmission message depending on the identified type of random access procedure.

19. The wireless communications apparatus of claim 14, wherein the memory further retains instruction related to concatenating the unencrypted portion with the encrypted portion within the scheduled transmission message.

20. The wireless communications apparatus of claim 19, wherein the unencrypted portion of the scheduled transmission message includes the non-security-critical information including the access terminal specific temporary identifier and the encrypted portion of the scheduled transmission message includes security-critical information.

21. The wireless communications apparatus of claim 19, wherein the unencrypted portion uses a Medium Access Control (MAC) layer Protocol Data Unit (PDU).

22. The wireless communications apparatus of claim 19, wherein the memory further retains instruction related to one of employing the unencrypted portion and the encrypted portion of the scheduled transmission message when using non-contention based random access or transmitting the scheduled transmission message as an encrypted message when using non-contention based random access.

23. A wireless communications apparatus, comprising:
a memory that retains instructions related to transmitting a random access preamble to a base station for at least one of initial access, re-entry from non-synchronized state, or handover from a source base station to the base station, receiving a random access response from the base station based upon the random access preamble, concatenating the unencrypted portion with an encrypted portion within a scheduled transmission message, wherein the unencrypted portion of the scheduled transmission message includes the non-security-critical information including the access terminal specific temporary identifier and the encrypted portion of the scheduled transmission message incorporating a first segmented part of security-critical information, transmitting the scheduled transmission message to the base station as granted by the random access response when employing contention based random access, and receiving a contention resolution message from the base station in response to the scheduled transmission message, and transmitting an encrypted subsequent normal scheduled transmission message to the base station after receiving the contention resolution message, the encrypted subsequent normal scheduled transmission message incorporating at least a second segmented part the security-critical information; and a processor, coupled to the memory, configured to execute the instructions retained in the memory.

24. A wireless communications apparatus that enables utilizing a random access procedure in a wireless communication environment, comprising:
means for sending a random access preamble that includes a common random access signature to a base station when employing contention based random access;
means for obtaining a random access response from the base station based upon the random access preamble; and
means for sending a scheduled transmission message including an encrypted portion and an unencrypted portion to the base station as granted by the random access response and before receiving a contention resolution message from the base station when employing contention based random access.

25. The wireless communications apparatus of claim 24, wherein the unencrypted portion of the scheduled transmission message includes non-security-critical information and an access terminal specific temporary identifier that enables the base station to recognize a source of the random access preamble and the scheduled transmission message.

26. The wireless communications apparatus of claim 24, further comprising means for sending an encrypted subsequent normal transmission message in response to a contention resolution message obtained from the base station in response to the scheduled transmission message, the encrypted subsequent normal transmission message includes security-critical information.

27. The wireless communications apparatus of claim 24, further comprising means for sending the scheduled transmission message as an encrypted message when employing non-contention based random access.

28. The wireless communications apparatus of claim 24, further comprising means for concatenating the unencrypted portion with the encrypted portion within the scheduled transmission message.

29. The wireless communications apparatus of claim 28, wherein the unencrypted portion of the scheduled transmission message includes non-security-critical information including an access terminal specific temporary identifier and the encrypted portion of the scheduled transmission message includes security-critical information.

30. The wireless communications apparatus of claim 28, further comprising means for employing the unencrypted portion and the encrypted portion of the scheduled transmission message when using non-contention based random access.

31. The wireless communications apparatus of claim 28, further comprising means for sending the scheduled transmission message as an encrypted message when using non-contention based random access.

32. A wireless communications apparatus that enables utilizing a random access procedure in a wireless communication environment, comprising:

means for sending a random access preamble that includes a common random access signature to a base station when employing contention based random access;

means for obtaining a random access response from the base station based upon the random access preamble;

means for concatenating an unencrypted portion with an encrypted portion within a scheduled transmission message;

means for segmenting security-critical information into at least two parts, wherein a first part of the security-critical information is included in the encrypted portion of the scheduled transmission message; and means for sending the scheduled transmission message to the base station as granted by the random access response when employing contention based random access.

33. A computer program product, comprising:
a computer-readable medium comprising:
  code for transmitting a random access preamble to a base station;
  code for receiving a random access response from the base station based upon the random access preamble; and
  code for transmitting a scheduled transmission message including an encrypted and an unencrypted portion to the base station as granted by the random access response and before receiving a contention resolution message from the base station when employing contention based random access.

34. The computer program product of claim 33, wherein the unencrypted portion of the scheduled transmission message includes non-security-critical information and an access terminal specific temporary identifier that enables the base station to recognize a source of the random access preamble and the scheduled transmission message.

35. The computer program product of claim 33, further comprising code for transmitting an encrypted subsequent normal transmission message in response to a contention resolution message received from the base station in response to the scheduled transmission message, the encrypted subsequent normal transmission message includes security-critical information.

36. The computer program product of claim 33, further comprising code for transmitting the scheduled transmission message as an encrypted message when employing non-contention based random access.

37. The computer program product of claim 33, further comprising code for concatenating the unencrypted portion with the encrypted portion within the scheduled transmission message.

38. The computer program product of claim 37, wherein the unencrypted portion of the scheduled transmission message includes non-security-critical information including an access terminal specific temporary identifier and the encrypted portion of the scheduled transmission message includes security-critical information.

39. The computer program product of claim 37, further comprising code for utilizing the unencrypted portion and the encrypted portion of the scheduled transmission message when using non-contention based random access.

40. The computer program product of claim 37, further comprising code for transmitting the scheduled transmission message as an encrypted message when using non-contention based random access.

41. A computer program product, comprising:
a computer-readable medium comprising:
  code for transmitting a random access preamble to a base station;
  code for receiving a random access response from the base station based upon the random access preamble;
  code for concatenating and unencrypted portion with and encrypted portion within a scheduled transmission message;
  code for segmenting security-critical information into at least two parts, wherein a first part of the security-critical information is included in the encrypted portion of the scheduled transmission message; and
  code for transmitting the scheduled transmission message to the base station as granted by the random access response when employing contention based random access.

42. In a wireless communications system, an apparatus comprising:
a processor configured to:
  transmit a random access preamble to a base station;
  receive a random access response from the base station based upon the random access preamble; and
  transmit a scheduled transmission message including an encrypted portion and an unencrypted portion to the base station as granted by the random access response and before receiving a contention resolution message from the base station when employing contention based random access.

\* \* \* \* \*